United States Patent
Nachtman et al.

(10) Patent No.: US 9,493,675 B2
(45) Date of Patent: *Nov. 15, 2016

(54) CLEAR SILOXANE-BASED WRITE-ERASE COATING WITH LOW VOLATILE ORGANIC CHARACTER

(71) Applicant: IdeaPaint, Inc., Boston, MA (US)

(72) Inventors: Frank C. Nachtman, West Bloomfield, MI (US); Kristopher M. Felice, Wolverine Lake, MI (US); Adam W. Emerson, Ypsilanti, MI (US); Martin Douglas Donbrosky, Jr., Lambertville, MI (US)

(73) Assignee: IDEAPAINT, INC., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/386,308

(22) PCT Filed: Jan. 21, 2013

(86) PCT No.: PCT/US2013/022429
§ 371 (c)(1),
(2) Date: Sep. 18, 2014

(87) PCT Pub. No.: WO2013/141958
PCT Pub. Date: Sep. 26, 2013

(65) Prior Publication Data
US 2015/0184021 A1    Jul. 2, 2015

Related U.S. Application Data

(60) Provisional application No. 61/612,918, filed on Mar. 19, 2012.

(51) Int. Cl.
| C08G 77/24 | (2006.01) |
| C09D 183/04 | (2006.01) |
| B43L 1/00 | (2006.01) |
| B43L 1/10 | (2006.01) |
| C09D 163/00 | (2006.01) |
| C08G 77/18 | (2006.01) |
| C08G 59/30 | (2006.01) |

(52) U.S. Cl.
CPC .............. C09D 183/04 (2013.01); B43L 1/00 (2013.01); B43L 1/002 (2013.01); B43L 1/10 (2013.01); C09D 163/00 (2013.01); C08G 59/306 (2013.01); C08G 77/18 (2013.01)

(58) Field of Classification Search
CPC .................................................. C09D 183/04
See application file for complete search history.

(56) References Cited

U.S. PATENT DOCUMENTS

| 4,678,835 A | 7/1987 | Chang et al. |
| 5,275,645 A | 1/1994 | Ternoir et al. |
| 5,549,949 A | 8/1996 | Williams et al. |
| 5,618,860 A * | 4/1997 | Mowrer et al. ............... 523/421 |
| 5,703,178 A | 12/1997 | Gasmena |
| 6,265,074 B1 | 7/2001 | Shah et al. |
| 6,521,345 B1 | 2/2003 | Lewin |
| 7,922,803 B2 | 4/2011 | Ito et al. |
| 8,309,653 B2 | 11/2012 | Goscha et al. |
| 2005/0148752 A1 | 7/2005 | Klaassens et al. |
| 2006/0122319 A1 | 6/2006 | Kneafsey et al. |
| 2006/0228470 A1 | 10/2006 | He et al. |
| 2007/0149656 A1 | 6/2007 | Rayner |
| 2007/0213492 A1 | 9/2007 | Mowrer et al. |
| 2009/0148603 A1 | 6/2009 | Goscha |
| 2009/0293768 A1 | 12/2009 | Atsuchi et al. |
| 2010/0151144 A1 | 6/2010 | Guo et al. |
| 2011/0098394 A1 | 4/2011 | Schmeltzer et al. |
| 2013/0029311 A1 * | 1/2013 | Goscha ........................ 434/408 |
| 2015/0018455 A1 | 1/2015 | Nachtman et al. |

FOREIGN PATENT DOCUMENTS

| EP | 2208766 A2 | 7/2010 |
| JP | 2003-003121 A | 1/2003 |
| WO | WO-2011/163175 A1 | 12/2011 |
| WO | WO-2013/110046 A1 | 7/2013 |
| WO | WO-2013/141958 A1 | 9/2013 |

OTHER PUBLICATIONS

International Search Report, PCT/US2013/022429, May 15, 2013, 5 pages.
Written Opinion, PCT/US2013/022429, May 15, 2013, 6 pages.
Extended European Search Report for EP 13738034.1, 6 pages (Sep. 2, 2015).
Extended European Search Report for EP 13765022.2, 5 pages (Sep. 2, 2015).
International Search Report for PCT/US2013/022428, 4 pages (May 15, 2013).
Written Opinion for PCT/US2013/022428, 7 pages (May 15, 2013).

* cited by examiner

*Primary Examiner* — Margaret Moore
(74) *Attorney, Agent, or Firm* — Choate, Hall & Stewart, LLP

(57) ABSTRACT

The present invention provides, among other things, compositions with at least one dry-erase characteristic and methods thereof. In some embodiments, provided paint composition comprising a resin part comprising an epoxy, a polysiloxane and an organooxysilane; and a cure part comprising one or more amino-silanes; the resin part and the cure part being designed and selected such that, when combined together, they cure to form a clear surface coating that demonstrates at least one dry-erase characteristic, wherein the composition is substantially free of any opacifying agent or pigment.

16 Claims, 1 Drawing Sheet

CLEAR SILOXANE-BASED WRITE-ERASE COATING WITH LOW VOLATILE ORGANIC CHARACTER

RELATED APPLICATIONS

This patent application is a National Stage Entry of International Application No. PCT/US2013/022429, entitled "CLEAR SILOXANE-BASED WRITE-ERASE COATING WITH LOW VOLATILE ORGANIC CHARACTER", and filed on Jan. 21, 2013. This application claims priority to U.S. provisional patent application Ser. No. 61/612,918, filed Mar. 19, 2012. The entire contents of each of which are herein incorporated by reference.

BACKGROUND

Dry erase products allow their users to write on a surface and then easily remove the writing, through multiple cycles. Such products have proven highly popular with and attractive to consumers, but many demonstrate inferior properties. There is a continuing need for new insights on improved dry-erase materials and technologies.

SUMMARY

The present invention encompasses the recognition of certain problems with coating materials that have write-erase character. The invention provides particular insights with respect to siloxane compound-containing materials, popular in the coatings industry because of excellent resistance to radiation (e.g., ultraviolet light), to chemical breakdown, and to chalking, in addition to their environmental compatibility. Siloxane compounds generally have low viscosities and can be used to prepare coatings with high solids content and relatively low volatile organic components (VOCs), and have been used to coat such items as storage tank exteriors, offshore platforms, bridges, exteriors of ships, hopper cars and exteriors of railway coaches. The present invention relates to a particular set of siloxane compound-containing materials; those that cure to form a surface with write-erase characteristics.

Among other things, the present invention identifies challenges in providing materials with sufficient hydrophobicity to achieve dry-erase character (e.g., resistance to penetration from marker solvents and/or pigments) that do not include unacceptably high (i.e., above 100 g/L, or even 140 g/L) levels of volatile organic components. In some embodiments, the present invention specifically provides siloxane compound-containing materials that cure to form dry-erase coatings and that contain less than 140 g/L, or less than 100 g/L VOCs. In some embodiments, provided siloxane compound-containing materials cure to form dry erase coatings characterized in that marks made on the coating surface marking material can be erased from the coating to be effectively invisible, resulting in little or no ghosting, even after prolonged normal use, for example. In some embodiments, provided siloxane compound-containing materials cure to form dry-erase coatings that maintain their character after about 10 cycles, after about 50 cycles, after about 100 cycles, after about 500 cycles, after about 1,000 cycles, after about 2,000 cycles, after about 3,000 cycles, after about 4,000 cycles, after about 5,000 cycles, after about 6,000 cycles, after about 7,000 cycles, after about 8,000 cycles, or after about 9,000 cycles of writing and erasing at the same position. In some embodiments, provided siloxane compound-containing materials show desired performance in specific write-erase tests. In some embodiments, provided siloxane compound-containing materials cure to a write-erase surface characterized by one or more of 1) average surface roughness (Ra) of less than about 7,500 nm; 2) a maximum surface roughness (Rm) of less than about 10,000 nm, 3) a 60 degree gloss of higher than 70; 4) a contact angle of less than about 150 degrees 5) a porosity of less than about 45 percent; 6) an elongation at break of between about 10 percent and about 100 percent; 7) a Sward hardness of greater than about 3; 8) a Taber abrasion value of less than about 150 mg/thousand cycles; and/or 9) a sag resistance of between about 4 mils and about 24 mils. In some embodiments, a "dry-erase"/"write-erase" material as described herein is characterized by a soak time as defined herein of at least about 4. In some embodiments, a "dry-erase"/"write-erase" material as described herein is characterized by one or more of the characteristics described herein.

The present disclosure also provides the surprising finding that certain previously described curable compositions that are characterized by particular write erase characteristics are sufficiently stable with respect to such write-erase characteristics that they maintain such characteristics independent of presence or level of an opacifying agent, and particularly of a titanium oxide opacifying agent. The present disclosure demonstrates that such opacifying-agent-free embodiments are characterized by the surprising and unexpected feature of maintaining one or more write erase characteristics observed in an otherwise-identical opacifying-agent-containing composition. Such compositions have the additional desirable attribute that they can cure to form a clear coating, and therefore can convert a surface of any color into a write-erase surface.

Definitions

In order for the present disclosure to be more readily understood, certain terms are first defined below.

"Curing" as used herein, refers to a process of setting (e.g., by evaporation (drying) and/or cross-linking) a material to form a coating on a substrate. In some embodiments, curing includes and/or is performed by exposure to ambient conditions, heat, radiation, and/or by cross-linking (e.g., oxidative cross-linking).

"Solvent-based" as used herein refers to compositions including solvents, where the solvents in the composition are predominantly organic solvents. Such organic solvents may be used either in their anhydrous or wet form unless specified otherwise. In many embodiments, the term is particularly applied to liquid compositions.

"Substantially solventless" is used herein to refer to compositions in which solvents are present at a level below about 10%, and in some embodiments below about 5% by weight/volume of the composition. In many embodiments, the term is particularly applied to liquid compositions.

"Solventless" is used herein to refer to compositions in which solvents are present at a level below about 1% by weight/volume of the liquid coating composition before application to a substrate. In many embodiments, the term is particularly applied to liquid compositions.

"Ambient conditions" as used herein refers to nominal, earth-bound conditions as they exist at sea level at a temperature of about 45-130° F. Typically, ambient conditions include a temperature within the range of 20-25° C., and a pressure around 100 kPa.

"Effectively invisible" as used herein refers to a color difference Delta E (ΔE) of less than 20 as calculated according to the ASTM Test Method D2244 before and after a mark is erased by an eraser.

"Substantially invisible" as used herein refers to a color difference Delta E (ΔE) of less than 10 as calculated according to the ASTM Test Method D2244 before and after a mark is erased by an eraser.

"Alkyl" as used herein, refers to a saturated or unsaturated hydrocarbon containing 1-20 carbon atoms including both acyclic and cyclic structures (such as methyl, ethyl, propyl, isopropyl, butyl, iso-butyl, sec-butyl, pentyl, hexyl, cyclopropyl, cyclobutyl, cyclopentyl, cyclohexyl, propenyl, butenyl, cyclohexenyl, and the like). A linking divalent alkyl group is referred to as an "alkylene" (such as ethylene, propylene, and the like).

As used herein, "aryl" refers to monocyclic or polycyclic (e.g., having 2, 3, or 4 fused rings) aromatic hydrocarbons such as, phenyl, naphthyl, anthracenyl, phenanthrenyl, indanyl, indenyl, and the like. In some embodiments, aryl groups have from 6 to 20 carbon atoms, from 6 to 15 carbon atoms, or from 6 to 10 carbon atoms.

As used herein, "heteroaryl" refers to an aromatic heterocycle having at least one heteroatom ring atom such as sulfur, oxygen, or nitrogen. Heteroaryl groups include monocyclic and polycyclic (e.g., having 2, 3, or 4 fused rings) systems. Examples of heteroaryl groups include without limitation, pyridyl, furyl, quinolyl, indolyl, oxazolyl, triazolyl, tetrazolyl, and the like. In some embodiments, the heteroaryl group has from 1 to 20 carbon atoms (e.g., from 3 to 20 carbon atoms). In some embodiments, the heteroaryl group has 1 to 4 heteroatoms (e.g., 1 to 3, or 1 to 2 heteroatoms).

As used herein, "aralkyl" refers to alkyl substituted by aryl. An example aralkyl group is benzyl.

As used herein, "alkoxy" refers to an -O- alkyl group. Example alkoxy groups include methoxy, ethoxy, propoxy (e.g., n-propoxy and isopropoxy), t-butoxy, and the like.

As used herein, "oxyalkylene" refers to an -O- alkylene group.

As used herein, "alkoxylate" refers to an alkyl-C(O)O. Example alkoxylates include acetate, stearate, and the like.

As used herein, "halo" includes fluoro, chloro, bromo, and iodo.

A "polyol" as used herein is a moiety that includes at least two hydroxyl (—OH) groups. The hydroxyl groups can be terminal and/or non-terminal. The hydroxyl groups can be primary hydroxyl groups.

A "polyurethane" as used herein is a polymeric or oligomeric material that includes a urethane linkage in its backbone.

As used herein, "epoxy" means an epoxy or polyepoxide polymer, including monomers or short chain polymers with an epoxide group at either end.

As used herein, the term "silane compound" is used to refer to any substituted or unsubstituted silane. A silane is a chemical compound containing both silicon and hydrogen, that is an analog of an alkane hydrocarbon. That is, a silanes consists of a chain of silicon atoms covalently bonded to each other and to hydrogen atoms. The general formula of a silane is $Si_nH_{2n+2}$. A "substituted silane" has a chemical structure that is related to that of a corresponding silane except that one or more of the hydrogen atoms has been substituted with a different chemical moiety. In some embodiments, a substituted silane for use in accordance with the present invention is a compound whose chemical structure is identical to that of a corresponding silane except that one or more hydrogens on the silane has/have been substituted with a moiety containing an amino group or a hydroxyl group, or both. In some embodiments, a substituted silane for use in accordance with the present invention contains one or more substituents (as compared with a reference silane) selected from the group consisting of amines, alcoholos, etc.; particular exemplary such groups include, for example, aminoethyl, methoxy, ethoxy, etc. In some particular embodiments, a substituted silane for use in accordance with the present invention is an aminosilane. One particular example of a substituted silane appropriate for use in accordance with the present invention is 2-amnoethyl-3-aminopropyl trimethoxysilane (DYNASYLAN DAMO), used in Examples below.

The term "siloxane compound", as used herein, encompasses siloxanes and polysiloxanes, and includes both branched and unbranched compounds, as well as side-chain-containing (e.g., organic-side-chain-containing) compounds. As is known in the art, a "siloxane" is a chemical compound composed of units of the form $R_2SiO$, where R is a hydrogen atom or a hydrocarbon group. Siloxanes are generally recognized to belong to the wider class of organosilicon compounds. Siloxanes for use in accordance with the present invention can have branched or unbranched backbones consisting of alternating silicon and oxygen atoms —Si—O—Si—O—, with side chains R attached to the silicon atoms. More complicated structures are also known, for example, eight silicon atoms at the corners of a cube connected by 12 oxygen atoms as the cube edges. Further, the term as used herein includes polymerized siloxanes, which may have organic side chains (R H), and are referred to in the art as silicones or as polysiloxanes. Representative examples of siloxane compounds for use in accordance with the present invention are $[SiO(CH_3)_2]$ (polydimethylsiloxane) and $[SiO(C_6H_5)_2]$ (polydiphenylsiloxane). It will be appreciated that such compounds are sometimes considered by those skilled in the art to be a hybrid of organic and inorganic compounds. The organic side chains confer hydrophobic properties while the —Si—O—Si—O— backbone is purely inorganic.

As will be understood by those in the art, the term "substituted" refers to a chemical compound having a structure identical to that of a reference compound except that one or more moieties of the reference compound has been "substituted" with a substituent moiety. In some embodiments, the structures of the substituted compound and reference compound are identical except that one or more hydrogen atoms in the reference compound has been substituted with a substituent moiety. In the broadest embodiments, a substitutent moiety can be any chemical entity that can bond to the rest of the molecule consistent with rules of chemical bonding. In many embodiments, a substitutent moiety has fewer than 100, 95, 90, 85, 80, 75, 70, 65, 60, 55, 50, 45, 40, 35, 30, 25, 20, 15, 10 atoms.

In general, a product or material described herein is considered to be a "dry-erase" or "write-erase", which terms are used interchangeably, if it is characterized in that it can be written on using a marking materials as discussed below, and such writing can be removed substantially completely with minimal effort and without the use of an applied solvent. In some embodiments, a material is considered to be "write-erase" or "dry-erase" if a marking material can be erased from the material to be effectively invisible, resulting in little or no ghosting, even after prolonged normal use, for example, after about 10 cycles (e.g., after about 50 cycles, after about 100 cycles, after about 500 cycles, after about 1,000 cycles, after about 2,000 cycles, after about 3,000 cycles, after about 4,000 cycles, after about 5,000 cycles, after about 6,000 cycles, after about 7,000 cycles, after about 8,000 cycles, or after about 9,000 cycles) of writing and erasing at the same position and/or have desired performance in specific write-erase tests. In some embodiments, a "dry-erase"/"write-erase" material as described herein is characterized by one or more of 1) average surface roughness (Ra) of less than about 7,500 nm; 2) a maximum surface roughness (Rm) of less than about 10,000 nm; 3) a 60 degree gloss of higher than 70; 4) a contact angle of less than about 150 degrees; 5) a porosity of less than about 45 percent; 6) an elongation at break of between about 10 percent and about 200 percent; 7) a Sward hardness of greater than about 3; 8) a Taber abrasion value of less than about 150 mg/thousand cycles; and/or 9) a sag resistance of between about 4 mils and about 24 mils. In some embodiments, a "dry-erase"/"write-erase" material as described herein is characterized by a soak time as defined herein of at least about 4. In some embodiments, a "dry-erase"/"write-erase" material as described herein is characterized by one or more of the characteristics described herein.

BRIEF DESCRIPTION OF THE DRAWING

The drawing is for illustration purposes only, not for limitation.

DETAILED DESCRIPTION OF CERTAIN EMBODIMENTS

Figure 1:
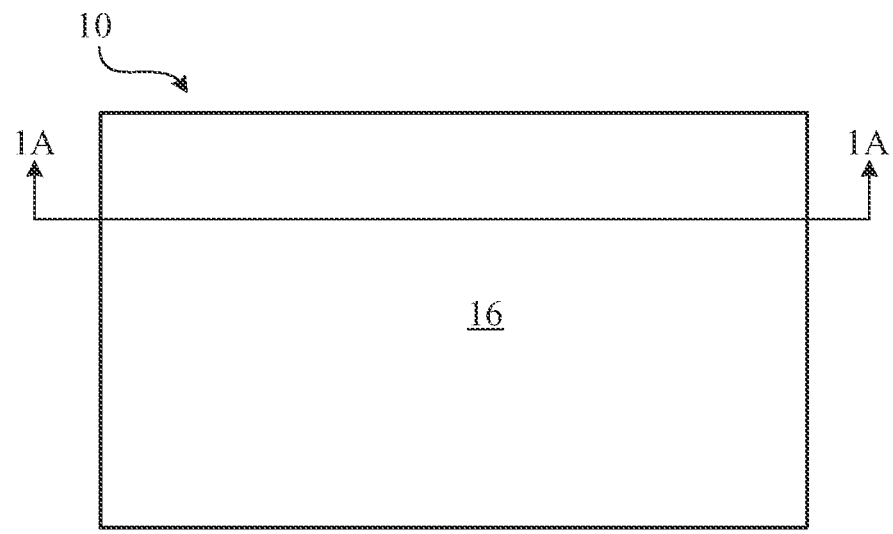
FIG. 1 depicts a top view of a writable-erasable product.

This disclosure relates to siloxane compound-based coatings having writable-erasable surfaces, products that include such coatings (e.g., whiteboards), materials that cure to form such coatings, and to methods of making and using the same. Generally, coatings herein provide writable-erasable surfaces on a substrate. In some embodiments, provided coatings are produced from one or more materials in an essentially solventless, or substantially solventless system as defined herein. In some embodiments, provided coatings form by curing cure under ambient conditions. In some embodiments, provided coatings cure faster and/or more completely in the presence of light, heat, and/or other types of radiation.

When the writable-erasable surface is marked with a marking material, the marking material can be erased to be effectively invisible (e.g., substantially invisible) with little or no ghosting, even after prolonged and repeated use. The one or more materials that form the coatings emit minimal volatile organic compounds (VOCs) after curing on the substrate. For example, the cured coating includes less than about 100 g/L or 140 g/L of volatile organic compounds ("VOC"). The resulting coatings have many desirable attributes, including one or more of the following: low porosity, low surface roughness, high elongation at break, high Taber abrasion resistance, and high Sward hardness.

Generally, while not intending to be bound by any theory, it is believed that the low porosity of provided coatings makes them substantially impervious to the marking materials, while the low surface roughness prevents the marking materials from becoming entrapped on the surface beyond effective reach of an eraser. After a writable-erasable surface is marked with a marking material including a colorant and a solvent, the marking material can be erased from the writable-erasable surface to be effectively invisible (e.g., substantially invisible).

In some embodiments, a writable-erasable product includes a cured coating (such as a cross-linked coating) extending upon a substrate and having a writable-erasable surface. In some embodiments, a coating material is applied to the surface as a substantially solventless liquid composition, wherein the liquid carrier is a combination of liquid and solid starting materials, but does not include and/or does not require addition of, an organic solvent (such as an alcohol, aceton, ketone, or other organic solvent). Alternatively or additionally, in some embodiments, such a coating material does not contain and/or does not require addition of more than about 10% by weight of water. An applied coating composition can be cured while on a substrate under ambient conditions.

By way of non-limiting illustration, exemplary coatings and/or coating compositions can be formed from one or more parts (e.g., components) each independently including one or more ingredients. In accordance with the present invention, one or both of the component compositions contains at least one siloxane compound. A siloxane-compound or siloxane-compound-containing material (e.g., a siloxane-compound-containing component) can be provided as a solid resin, or in a solvent-based carrier. For example, siloxane compounds herein, and/or compositions comprising them (e.g., a siloxane-compound-containing material or component) can be provided as liquids, solids, or any combination thereof (powders, solutions, suspensions, mixtures, etc.). Particular exemplary, non-limiting siloxane compounds appropriate for use in accordance with the present invention can, for example, be or comprise one or more cyclic siloxane compounds such as hexamethylcyclotrisiloxane, octamethylcyclotetrasiloxane, decamethylcyclopentasiloxane and dodecamethylcyclohexasiloxane, and/or one or more linear siloxane compounds such as hexamethyldisiloxane, octamethyltrisiloxane, decamethyltetrasiloxane and polydimethylsiloxane.

The present disclosure exemplifies coating compositions comprising one or more materials including one or more siloxane compounds. Exemplary coating compositions are generated by combining component formulations that include at least one resin part (as component A) and at least one cure part (as component B), the cure part including one or more of siloxane compounds.

In some embodiments, one or more materials, ingredients, and/or components utilized to produce write erase coating compositions in accordance with the present invention can be in a liquid carrier. The liquid carrier can be a result of mixing one or more starting materials that are present in a liquid physical state, and/or by combining one or more starting materials in a solid state with one or more starting materials in a liquid state. In many embodiments, some or all of the liquids used in accordance with the practice of the present invention are solventless. Liquid or non-liquid starting materials can be mixed into a liquid state starting material to form either part/component—whether the resin part, or the cure part, or both. After a resin part and a cure part are mixed together, they form a coating composition that can be applied to the surface of a substrate to generate a coating that cures to form a writable-erasable surface. In many embodiments, the cure part has the effect of hardening the composition, whether by cross-linking or other chemical and physical processes. After curing, the coating is hard and smooth and substantially non-porous so that it can be marked with a marking material including a colorant and a solvent, and thereafter, the marking material can be erased from the writable-erasable surface to be effectively invisible (e.g., substantially invisible). While white coatings are preferable for "white boards", the coating can be produced in any desirable color, such as by the addition of colorants and/or pigments to the liquid state composition before curing.

In another aspect, the disclosure describes a method of making a writable-erasable product. A provided method includes applying the coating described herein to a substrate and curing the coating (e.g., under ambient conditions) to provide a cured coating defining a writable-erasable surface.

A coating can be formed from one or more materials, components, or parts, each independently or collectively including one or more substances including any or all of: a silane, an epoxy, a siloxane, and optionally other ingredients such as UV absorbers, preservatives, and biocidal agents, for example. In some embodiments, one or more, one or materials are in form of resin solid (e.g., epoxy resin). In some embodiments, at least one of one or more of the materials can be provided in a liquid state. Optionally, one or more materials are provided in a solvent carrier, preferably using water as a solvent carrier, and less preferably using an organic solvent.

In some embodiments, a composition can further optionally include additives such as a catalyst, a surface additive, a surfactant, a wetting agent, a defoaming agent, a pigment, a biocide, and/or a colorant.

In another aspect, the disclosure describes a writable-erasable product including a cured coating extending upon a substrate and having a writable-erasable surface. A coating composition described herein can be applied to a surface, so that the coating forms on the surface. At least one of one or more materials used in preparing such coating compositions can be in a liquid state, for example in a substantially solventless carrier, curing, the resulting writable-erasable surface can bemarked with a marking material including a colorant and a solvent, and the marking material can be erased from the writable-erasable surface to be effectively invisible (e.g., substantially invisible).

In some embodiments, a catalyst is included, preferably in at least one of the resin part or cure part, or both. Preferably, a catalyst is included in a cure part. In some embodiments, a catalyst can be or comprise a tin catalyst as discussed below. In certain embodiments, a catalyst can be or comprise dibutyltin dilaurate (DBTDL). In other examples, it is provided as triethylamine. In some examples, a UV absorber is also provided, preferably in a cure part. Sometimes, the UV absorber is provided as a sebacate, such as 1,2,2,6,6-pentamethyl-4-piperidyl sebacate (CAS 41556-26-7).

In some embodiments, where a solvent-based carrier is included, the solvent can include one or more hydrocarbons (such as saturated hydrocarbons and unsaturated hydrocarbons), alcohols (such as alkoxy alcohols, ketonic alcohols), ketones, esters (such as acetates), mineral spirits, bio-based solvents, or mixtures thereof. Examples of such solvents can include ethyl benzene, toluene, xylene, naphtha (petroleum), petroleum distillates, n-butyl acetate, methyl iso-amyl ketone, Stoddard solvent, t-butyl acetate, acetone, isopropyl alcohol, 2-butoxyethanol, toluene, methanol, propanol, 2-butanol, iso-amyl alcohol, methyl amyl alcohol, pentane, heptane, odorless mineral spirits, methyl ethyl ketone, diacetone alcohol, methyl amyl ketone, ethyl amyl ketone, diisobutyl ketone, methyl heptyl ketone, ethyl acetate, isopropyl acetate, propyl acetate, isobutyl acetate, n-butyl acetate, glycol ether EM acetate, amyl acetate, isobutyl isobutyrate, glycol ether EE acetate, glycol ether EB acetate, 2-ethylhexyl acetate, glycol ether DE acetate, glycol DB acetate, methyl isobutyl ketone, dipropylene glycol butoxy ether, vegetable oil, corn oil, sunflower oil, or their mixtures. However, in the preferred embodiments, any such solvent comprises less than 10%, and more preferably less than 5%, and most preferably less than 1% by weight of the coating composition in its liquid state (before application to substrate and curing).

In some embodiments, a substrate can be selected from the group consisting of cellulosic material, glass, wall (such as plaster or painted wall), fiber board (e.g., a whiteboard in which the cured coating can be extending upon a fiber board), particle board (e.g., a chalkboard or blackboard), gypsum board, wood, plastics (such as high density polyethylene (HDPE), low density polyethylene (LDPE), or a acrylonitrile, butadiene, styrene (ABS)-based material), densified ceramics, stone (such as granite), and metal (such as aluminum or stainless steel). In some embodiments, the substrate can be selected from a flexible film or a rigid structure.

In some embodiments, a marking material includes a solvent including water, alcohols (such as alkoxy alcohols, ketonic alcohols), ketones, esters (such as acetates), mineral spirits, bio-based solvents, or their mixtures. In some embodiments, the marking material can be erased from the writable-erasable surface to be effectively invisible by wiping the marks with an eraser including a fibrous material (such as a paper towel, rag, or felt material). In some embodiments, the eraser is dry or includes water, alcohol (e.g., ethanol, n-propanol, isopropanol, n-butanol, isobutanol, benzyl alcohol), alkoxy alcohol (e.g., 2-(n-propoxy) ethanol, 2-(nbutoxy)ethanol, 3-(n-propoxy)ethanol), ketone (e.g., acetone, methyl ethyl ketone, methyl nbutyl ketone), ketonic alcohol (e.g., diacetone alcohol), ester (e.g., methyl succinate, methyl benzoate, ethyl propanoate), acetate (e.g., methyl acetate, ethyl acetate, n-butyl acetate, t-butyl acetate), mineral spirit, or mixtures thereof.

In some embodiments, a writable-erasable product can take the form of a whiteboard, in which the cured coating extends upon a fiberboard, can form a part of a wall e.g., of a structure, or can form a plurality of sheets, each sheet including a substrate (e.g., in the form of a paper) having the cured coating extending thereupon.

In some embodiments, prior to combining, the one or more materials including the resin part can be in a first container, and the one or more materials including one or more cure parts can be in a second container. Optionally, a catalyst can be combined with the cure part prior to mixing with the resin part.

Embodiments and/or aspects may include one or more of the following advantages. Coating surfaces are writable and erasable. The coatings can provide writing surfaces that exhibit little or no image ghosting, even after prolonged normal use. Coatings can be simple to prepare and can be applied to many different substrates, including both porous (e.g., paper) and non-porous substrates (e.g., densified ceramics). Coatings can be applied to various substrates including, but not limited to, chalkboards (e.g., blackboards), whiteboards, drywalls, gypsum boards, plaster, and painted walls. A solvent-based coatings can be applied on the substrate on-site rather than being manufactured in a factory. For many substrates, a single coating can provide an adequate writable-erasable surface. Coatings can exhibit good adhesive strength to many substrates. Coating components (prior to mixing) can have an extended shelf-life, e.g., up to about three years or even up to six years. Coatings can be readily resurfaced. Coatings can cure rapidly, e.g., in less than about 12 to 60 hours, and more preferably between about 24 to about 48 hours, under ambient conditions. Coatings can resist yellowing, as determined by ASTM method G-154, for an extended period of time (e.g., up to 2000 hours or even up to 5000 hours). Coatings do not require UV light or high-energy radiation, such as a beam of electrons, for curing. Nevertheless, in some embodiments, light, e.g., UV light, or heat can be utilized to enhance the curing rate. Coatings can have a reduced tendency to run even when applied upon a vertical substrate. Surface gloss of the coatings can be readily adjusted. The writing surface of the coating can be projectable. Coatings can be hard. Coatings can be substantially impervious to organic solvents and/or inks. Coatings can have a low porosity. Surfaces of coatings can have a low roughness. Coatings can be impact resistant. Coatings can be made scratch and abrasion resistant. Coatings can be relatively low cost. The coatings can have a high chemical resistance.

Dry Erase Product

Figure 1A:
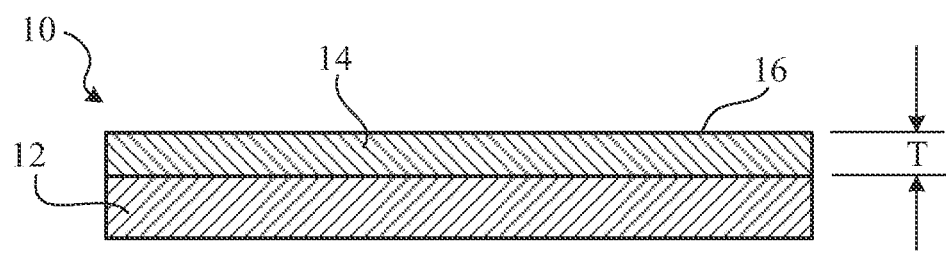
FIG. 1A depicts a cross-sectional view of the writable-erasable product of FIG. 1, taken along 1A-1A.
Figure 2:
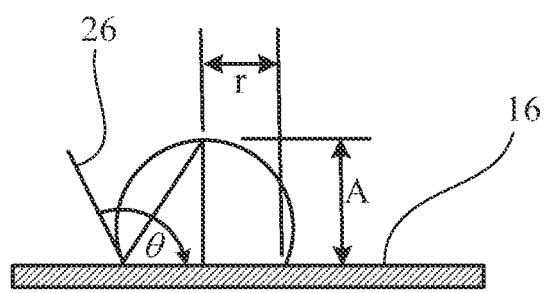
FIG. 2 depicts a cross-sectional view of a droplet of water on a coating and illustrates a method for determining contact angle.

Referring to FIGS. 1 and 1A, a writable-erasable product 10 includes a substrate 12 and a coating 14 (e.g., a cured coating) extending upon the substrate 12. The cured coating 14 has a writable-erasable surface 16. When the writable-erasable surface 16 is marked with a marking material, the marking material can be erased from the writable-erasable surface to be effectively (e.g., substantially) invisible, resulting in little or no ghosting, even after prolonged normal use, for example, after about 10 cycles (e.g., after about 50 cycles, after about 100 cycles, after about 500 cycles, after about 1,000 cycles, after about 2,000 cycles, after about 3,000 cycles, after about 4,000 cycles, after about 5,000 cycles, after about 6,000 cycles, after about 7,000 cycles, after about 8,000 cycles, or after about 9,000 cycles) of writing and erasing at the same position. The visibility, or the lack thereof, of the erasing can be determined by measuring the color change (Delta E, $\Delta E$) on the writable-erasable surface using a spectrophotometer (such as the SP-62 portable spectrophotometer available from X-Rite), after marking on the surface and erasing the marking. The color change is a composite of three variables, lightness ($L^*$), red/green value ($a^*$), and yellow/blue value ($b^*$). The erasability characteristics of the writable erasable surface 16 can be defined in terms of the $\Delta E$ value. In some embodiments, the $\Delta E$ for the writable-erasable surface 16 after 5,000 cycles (or even after 10,000 cycles) can be less than about 50, e.g., less than about 40, less than about 30, less than about 20, less than about 10, less than about 9, less than about 8, less than about 7, less than about 6, less than about 5, less than about 4, less than about 3, less than about 2, or less than about 1.

In some embodiments, the $\Delta E$ for the writable-erasable surface 16 after 5,000 cycles (or even after 10,000 cycles) can be in a range of about 0.1 to about 10.0, e.g., about 0.1 to about 0.5, about 0.5 to about 1.0, about 1.0 to about 1.5, about 1.5 to about 2.0, from about 2.0 to about 2.5, about 2.5 to about 3.0, about 3.0 to about 3.5, about 3.5 to about 4.0, about 4.0 to about 4.5, about 4.5 to about 5.0, about 5.0 to about 5.5, about 5.5 to about 6.0, about 6.0 to about 6.5, about 6.5 to about 7.0, about 7.0 to about 7.5, about 7.5 to about 8.0, about 8.0 to about 8.5, about 8.5 to about 9.0, about 9.0 to about 9.5, or about 9.5 to about 10.0.

It is to be appreciated that the erasability characteristic may also be evaluated based on the differences in $L^*$ ($\Delta L^*$), without attribution to color differences. This evaluation can also be combined with the progressive abrasion of the coating on an abrader, such as the Taber abrader 4360. The abrasion of the coating can be performed similar to the ASTM Method D4060. In this instance, the erasability characteristic as a function of the abrasion can be determined by abrading the writable-erasable surface 16 for a certain number of cycles and then measuring the change in lightness ($\Delta L^*$) value after marking on the surface followed by erasing the marking. Typically, a substrate with a cured coating can be loaded on an abrader and abrasive wheels can be rotated on the writable-erasable surface 16 for a certain number of cycles (e.g., about 50 cycles, about 100 cycles, about 150 cycles, about 200 cycles, about 500 cycles, or about 1,000 cycles). After each abrasive cycle, a spectrophotometer (such as the SP-62 portable spectrophotometer available from X-Rite) can be used to measure the $L^*$ of the abraded area ($L^*_a$) and the writable-erasable surface 16 can be marked with a marking material (such as an Expo® 1 or Expo® 2, blue or black marker) and erased (such as with an Expo® felt dry eraser). A spectrophotometer (such as the SP-62 portable spectrophotometer available from X-Rite) can be used to measure the $L^*$ value of the erased area ($L^*_b$). The $\Delta L^*$ can be determined from the difference of $L^*_a$ and $L^*_b$ values. In some embodiments, the $\Delta L^*$ value for the writable-erasable surface 16 after 1,000 cycles can be at least about 20, e.g., at least about 30, at least about 40, at least about 50, at least about 60, at least about 65, at least about 70, at least about 75, at least about 80, at least about 85, at least about 90, or at least about 99. In some other embodiments, the $\Delta L^*$ value for the writable-erasable surface 16 after 1,000 cycles can be at least about 65, e.g., at least about 67, at least about 69, at least about 71, at least about 73, at least about 75, at least about 77, at least about 79, at least about 81, at least about 83, at least about 85, at least about 87, at least about 89, or at least about 91. In yet other embodiments, the $\Delta L^*$ value for the writable-erasable surface 16 after 1,000 cycles can be from about 65 to about 70, from about 70 to about 75, from about 75 to about 80, from about 80 to about 85, from about 85 to about 90, from about 90 to about 95, or from about 95 to about 99.

Advantageously, when the writable-erasable surface 16 is marked with a marking material, the marking material can be erased from the writable-erasable surface to be effectively (e.g., substantially) invisible.

A marking material can include a colorant (e.g., a pigment) and a solvent such as water, alcohol (such as alkoxy alcohol, ketonic alcohol), ketone, ester (such as acetate), mineral spirit, bio-based solvents (e.g., vegetable oil, corn oil, sunflower oil). Mixtures of any of the noted solvents can also be used. For example, mixtures of two, three, four or more of the noted solvents may be used. Bio-based solvents are alternatives to conventional organic solvents and can be obtained from agricultural products. Such solvents can provide lower volatile organic compounds in coatings and decreased environmental impact. A marking material can be selected from any of the industry standard dry-erase markers.

In some embodiments, the marking material can be erased from the writable-erasable surface 16 to be effectively (e.g., substantially) invisible by wiping the marks with an eraser that includes a fibrous material. For example, the eraser can be in the form of a disposable wipe, a cloth, or a supported (e.g., wood, plastic) felt. The eraser can also include a solvent such as water, alcohols (e.g., alkoxy alcohols, ketonic alcohols), ketones, esters, (e.g., acetates), or mineral spirits. Mixtures of any two or more of these solvents can also be used.

Examples of alcohols that can be used in the marking material or the eraser include ethanol, n-propanol, iso-propanol, n-butanol, iso-butanol, benzyl alcohol, 2-(n- propoxy)ethanol, 2-(n-butoxy)ethanol and 3-(n-propoxy) ethanol. Examples of ketones that can be used in the marking material or the eraser include acetone, methyl ethyl ketone and methyl nbutyl ketone. Examples of esters that can be used in the marking material or the eraser include methyl acetate, ethyl acetate, n-butyl acetate, and t-butyl acetate.

Compositions that form the coating 14 can be applied to many different types of substrates, including porous (e.g., paper) and non-porous substrates (e.g., densified ceramics). The substrate 12 can be a flexible film or a rigid movable or immovable structure. Examples of the substrate include, but not limited to, a polymeric material (such as a polyester or a polyamide), a cellulosic material (such as paper), glass, wood, plastics (such as HDPE, LDPE, or an ABS-based material), a wall (such as a plaster or painted wall), a fiber board (such as a whiteboard in which the cured coating extends upon a fiber board), a particle board, (such as a chalkboard or blackboard), a gypsum board, densified ceramics, stone (such as granite), and a metal (such as aluminum or stainless steel). The substrate could be a newly built structure or even an old and worn out chalkboard, blackboard, or whiteboard. In some instances, the surface of the substrate can be cleaned by sanding the surface and priming the surface prior to application of the coating. In some instances, the surface can also be cleaned with a cleaning agent (e.g., acetone or a mild acid) in order to provide better adhesion of the coating to the surface.

Compositions that that form the coating 14, prior to the application on substrates, can have a pot life which is the period during which the materials must be applied on the substrate. In some embodiments, the materials can have a pot life in a range of about 10 minutes to about 16 hours, for example, about 30 minutes to about 12 hours, about 60 minutes to about 8 hours, about 2 hours to about 4 hours, or about 1 hour to about 4 hours, or about 1 hour to about 2 hours. In other embodiments, the materials can have a pot life of greater than about 6 months, for example, about 12 months, about 18 months, about 24 months, about 30 months, or about 36 months. In the embodiments herein that are substantially solventless, the pot life of the composition after mixing the resin part and any cure part(s) is preferably in a range of about 4 to about 6 hours.

Compositions that that form the coating 14, upon application to the substrate(s), typically cure under ambient conditions. While not intending to be bound by any theory, it is believed that cross-linking between polymeric chains can influence certain unique properties of coatings. In some optional embodiments, the curing can be facilitated by ultra-violet (UV) light, thermal means, initiators, electron-beams, and combinations thereof. The coating 14 on the substrate 10 can cure under ambient conditions in from about 4 hours to about a week, e.g., from about 4 hours to about 24 hours, from about 8 hours to about 20 hours, from about 12 hours to about 16 hours, from about 1 day to about 7 days, from about 2 days to about 6 days, or from about 3 days to about 5 days. The cured coating 14 can be generally stable and also emit little or no VOCs after curing. Curing under ambient conditions can reduce environmental impact and can make the materials safer to use.

The porosity of a coating (e.g., a cured coating) can determine the amount of marking material that can be trapped in the coating. While not intending to be bound by any theory, it is believed that lower porosity of coatings can lead to better writable-erasable surfaces. In some embodiments, the coating 14 can have a porosity in a range of about 1 percent and about 40 percent, e.g., about 2 percent and about 35 percent, about 2.5 percent and about 30 percent, or about 3 percent and about 20 percent. In other embodiments, the coating 14 can have a porosity of less than about 40 percent, e.g., less than about 35 percent, less than about 30 percent, less than about 25 percent, less than about 20 percent, less than about 15 percent, less than about 10 percent, less than about 5 percent, or even less than about 2.5 percent.

In some embodiments, a coating (e.g., a cured coating) can have a porosity in a range of about 2 percent and about 45 percent, e.g., about 2.5 percent and about 35 percent, or about 3 percent and about 35 percent. In some specific embodiments, the coating can have a porosity of about 3 percent, about 33 percent, or about 34 percent.

Materials/parts/compositions/formulations used in preparing write-erase coatings in accordance with the present invention can be prepared by any of a variety of approaches, including often by standard techniques known to one skilled in the art. For example, pre-determined amounts of one or more ingredient materials to be used can be mixed at required speeds in high shear dispersers until the materials are homogeneously dispersed. The degree of dispersion of the materials and pigments can be determined with a Hegman gauge. One or more additional ingredients (including all remaining ingredients, if desired, can be introduced, for example at a letdown stage to obtain a final formulation appropriate for packaging. In two-component coating formulations, the two parts can be mixed thoroughly and can be allowed to stand for a period of time before being applied on a substrate.

A coating formulation can be applied on a substrate 12 in a single coat or multiple coats using a roller, a spray (such as an aerosol spray), a brush, or using other types of applicators. In some embodiments, it can be painted using a foam roller in a single coat. In some embodiments, the coating (e.g., before or after curing) 14 can have a thickness, T (FIG. 1A), in a range of e.g., about 0.001 inch and about 0.125 inch, e.g., about 0.002 inch and about 0.1 inch, about 0.004 inch and about 0.08 inch, about 0.006 inch and about 0.06 inch, about 0.008 inch and about 0.04 inch, or about 0.01 inch and about 0.02 inch). In other embodiments, the coating (e.g., before or after curing) 14 can have a thickness of greater than about 0.005 inch, e.g., greater than about 0.0075 inch or greater than about 0.010 inch. While not intending to be bound by any theory, it is believed that providing a uniform, adequate coating thickness, T, reduces the likelihood of thin or uncoated substrate portions where marking materials might penetrate.

In some embodiments, a coating (e.g., a cured coating) 14 can have a Taber abrasion value of less than about 150 mg/thousand cycles, e.g., less than about 100 mg/thousand cycles, less than about 75 mg/thousand cycles, less than about 50 mg/thousand cycles, less than about 35 mg/thousand cycles, less than about 25 mg/thousand cycles, less than about 15 mg/thousand cycles, less than about 10 mg/thousand cycles, less than about 5 mg/thousand cycles, less than about 2.5 mg/thousand cycles, less than about 1 mg/thousand cycles, or even less than about 0.5 mg/thousand cycles. Maintaining a low Taber abrasion value can provide long-lasting durability to the coating, reducing the incidence of thin spots which could allow penetration of marking material through the coating and into the substrate.

In some embodiments, a coating (e.g., a cured coating) 14 can have a Sward hardness of greater than about 10, e.g., greater than about 15, greater than about 25, greater than about 50, greater than about 75, greater than about 100, greater than about 120, greater than about 150, or even greater than about 200. Without being bound by theory, the inventors propose that maintaining a high Sward hardness provides long-lasting durability and scratch resistance to the coating. Marking material entrapped in scratches can be difficult to erase.

In some specific embodiments, a coating (e.g., a cured coating) 14 can have a Sward hardness in a range of about 10 and about 75, e.g., about 15 and about 70 or about 15 and about 55. In some specific embodiments, the coating can have a Sward hardness of about 15, about 22 or about 25.

In some embodiments, elongation at break for a coating can be in a range of about 5 percent and about 400 percent, e.g., about 25 percent and about 200 percent, or about 50 percent and about 150 percent. In other embodiments, the elongation at break can be greater than about 10 percent, e.g., greater than about 25 percent, greater than about 50 percent, or even greater than about 100 percent. While not intending to be bound by theory, it is believed that maintaining high elongation at break provides long-lasting durability to the coating and it allows the coating to be stressed without forming cracks. Cracks can trap marking materials making erasure from surfaces difficult and, hence, decreasing the longevity of the writable-erasable products.

In some embodiments, sag resistance for a coating can be at least about 3 mils, e.g., about 4 mils, about 5 mils, about 6 mils, about 7 mils, about 8 mils, about 9 mils, about 10 mils, about 12 mils, about 14 mils, about 16 mils, about 18 mils, about 20 mils, about 22 mils, or about 24 mils. In other embodiments, the coating 14 can have a sag resistance in a range of about 4 mils to about 24 mils, e.g., about 5 mils to about 20 mils, about 6 mils to about 18 mils, about 7 mils to about 16 mils, about 8 mils to about 14 mils, about 9 mils to about 12 mils, or about 10 mils to about 12 mils.

In some embodiments, a writable-erasable surface 16 can have an average surface roughness (Ra) in a range of about 0.5 nm and about 7,500 nm, e.g., about 1 nm and about 6,000 nm, about 2 nm and about 5,000 nm, about 5 nm and about 2,500 nm, about 10 nm and about 1,500 nm, about 20 nm and about 1,000 nm or about 25 nm and about 750 nm. In other embodiments, the writable-erasable surface 16 can have an average surface roughness ($R_a$) of less than about 7,500 nm, e.g., less than about 5,000 nm, less than about 3,000 nm, less than about 2,000 nm, less than about 1,000 nm, less than about 500 nm, less than about 250 nm, less than about 200 nm, less than about 100 nm, or even less than about 50 nm. In certain embodiments, the writable-erasable surface 16 can have an average surface roughness (Ra) in a range of about 75 nm and about 1,000 nm, e.g., about 100 nm and about 500 nm or about 150 nm and about 400 nm. In certain embodiments, the writable-erasable surface 16 can have an average surface roughness (Ra) of about 150 nm, about 300 nm, or about 1,000 nm.

In some embodiments, a writable-erasable surface 16 can have a maximum surface roughness (Rm) of less than about 10,000 nm, e.g., less than about 8,000 nm, less than about 6,500 nm, less than about 5,000 nm, less than about 3,500 nm, less than about 2,000 nm, less than about 1,000 nm, or less even than about 500 nm.

In some embodiments, a writable-erasable surface 16 can have a flat finish (gloss below 15, measured at 85 degrees), an eggshell finish (gloss between about 5 and about 20, measured at 60 degrees), a satin finish (gloss between about 15 and about 35, measured at 60 degrees), a semi-gloss finish (gloss between about 30 and about 65, measured at 60 degrees), or gloss finish (gloss greater than about 65, measured at 60 degrees).

In some specific embodiments, a writable-erasable surface 16 can have a 60 degree gloss in a range of about 45 and about 90, e.g., about 50 and about 85. In other embodiments, the writable-erasable surface 16 can have a 20 degree gloss in a range of about 10 and about 50, e.g., about 20 and about 45. In still other embodiments, the writable-erasable surface 16 can have a 85 degree gloss in a range of about 45 and about 90, e.g., about 75 and about 90. In other specific embodiments, the writable-erasable surface 16 can have a 20 degree gloss of about 12, about 23, or about 46; or a 60 degree gloss of about 52, about 66, or about 85; or a 85 degree gloss of about 64, about 78, or about 88.

In some embodiments, to improve the writability and erasability of the surface 16 of the coating 14, materials can be chosen so that a cured coating 14 has a surface that is relatively hydrophilic and not very hydrophobic. Referring to FIG. 1A, hydrophobicity of the writable-erasable surface 16 is related to its wettability by a liquid, e.g., a water-based marking material. It is often desirable to quantify the hydrophobicity of the writable-erasable surface 16 by a contact angle. Generally, as described in ASTM D 5946-04, to measure contact angle, 0, for a liquid (such as water) on the writable-erasable surface 16, an angle is measured between the writable-erasable surface 16, and a tangent line 26 drawn to a droplet surface of the liquid at a three-phase point. Mathematically, 0 is 2×arctan(A/r), where A is the height of the droplet image, and r is half width at the base. In some embodiments, it can be desirable for the writable-erasable surface 16 to have contact angle, 0, measured using deionized water of less than about 150 degrees e.g., less than about 125 degrees, less than about 100 degrees, less than about 75 degrees, or even less than about 50 degrees. In other embodiments, it can be desirable for the writable-erasable surface 16 to have contact angle 0 above about 35 degrees, e.g., above about 40 degrees, or above about 45 degrees.

In certain embodiments, contact angle, 0, measured using deionized water, can be in a range of about 30 degrees and about 90 degrees, e.g., about 45 degrees and about 80 degrees, or about 39 degrees and about 77 degrees. In some specific embodiments, the contact angle can be about 40 degrees, for example, about 50 degrees, about 60 degrees, about 73 degrees, or about 77 degrees.

In some embodiments, a writable-erasable surface 16 can have a surface tension in a range of about 30 dynes/cm and about 60 dynes/cm, e.g., about 40 dynes/cm and about 60 dynes/cm. In some embodiments, the writable-erasable surface 16 can have a surface tension of about 22 dynes/cm, about 25 dynes/cm, about 30 dynes/cm, about 42 dynes/cm, about 44 dynes/cm, or about 56 dynes/cm. In some embodiments, the writable-erasable surface 16 can have a surface tension more than about 22 dynes/cm, about 25 dynes/cm, about 30 dynes/cm, about 42 dynes/cm, about 44 dynes/cm, or about 56 dynes/cm.

In general, a coating (e.g., a cured coating) 14 can be formed by applying (e.g., rolling, painting, or spraying) a solution of the material in a solvent-based carrier that can have a sufficient viscosity such that the applied coating 14 does not run soon after it is applied or during its curing. At the same time, the solution viscosity should be sufficient to permit easy application. In some embodiments, the applied solution can have a viscosity at 25° C. in a range of about 75 mPas and about 20,000 mPas, e.g., about 200 mPas and about 15,000 mPas, about 1,000 mPas and about 10,000 mPas, or about 750 mPas and about 5,000 mPas.

For testing, a coating (e.g., a cured coating) 14 can be made by casting a material on a fluoropolymer substrate and then curing the material so that it can have a dry thickness of about 0.002 inch. The cured sample can then be removed from the fluoropolymer substrate to provide the test specimen. Testing can be performed at 25° C. Elongation at break can be measured using ASTM method D-882; porosity can be measured using mercury porosimetry (suitable instruments available from Micromeritics, Norcross, Ga., e.g., Micromeritics Autopore IV 9500); surface roughness can be measured using atomic force microscopy (AFM) in tapping mode using ASME B46.1 (suitable instruments, e.g., WYKO NT8000, are available from Park Scientific); Taber abrasion resistance can be measured according to ASTM method D-4060 (wheel CS-17, 1 kg load) and Sward hardness can be measured according to ASTM method D-2134 (Sward Hardness Rocker Model C). VOC level(s) can be determined using the EPA Method 24. Gloss can be measured using ASTM method D-523-89 (BYK Tri-Gloss Meter Cat. No. 4525). Contact angle can be measured with deionized water using the dynamic contact angle method (Angstroms Model FTA 200) using ASTM method D-5946-04. Sag resistance can be measured using ASTM method D4400 which can be performed by obtaining a draw-down and measuring visually by comparison with standard ASTM pictures. Surface tension can be measured using AccuDyne Marking Pens. Stormer Viscosity can be measured on a Brookfield Viscometer by ASTM method D-562 and reported in Kreb units (Ku).

Formulations

The cured coating 14 having the writable-erasable surface 16 can be formed under ambient conditions from an uncured coating formulation. The coating formulations, in general, can include the materials described below. In some embodiments, formulations can be or include a one-component system and/or a multi-component system (e.g., a two-component system). In some embodiments, a coating composition and/or its parts will not cure if denied light and sealed in a substantially air-free container. A one-component system, for example, consists of a coating formulation material packaged to be ready for use. A two-component system, for example, consists of two coating materials that are mixed, upon demand and when desired, to obtain the final liquid coating formulation prior to application on the substrate.

Silane Compound-Based Epoxy

A silane compound-based epoxy coating formulation can be obtained by mixing an epoxy resin with at least one siloxane compound (silicone, for example), and thereafter adding at least a cure part. The silane compound-based epoxy resins can include polyether chains that contain one or more epoxide units in their structure. Polyethers have the repeating oxyalkylene units: alkylene substituted by oxygen groups, e.g., ethyleneoxy (—[$CH_2$—$CH_2O$]—). In some embodiments, the polyether chains can have additional functional groups such as hydroxyl (—OH). Curing of epoxy resins can lead to less amount of volatile products.

Due to the unique properties of the epoxide ring structure, curing agents (e.g., catalyst) in a cure part can be either nucleophilic or electrophilic. Examples of nucleophilic agents include alcohols, phenols, amines, amino silanes, thiols, carboxylic acids, and acid anhydrides. Examples of electrophilic agents include aryl iodonium salts, aryl sulfonium salts, and latent acid catalysts (e.g., dibutyltin diacetatonate CAS 22673-19-4, aka 4-pentanedionato-o,o')-dibutyl bis(oc-6-11)-ti; dibutyl bis(2,4-pentanedionato-,o')-, (oc-6-11)-tin; di-n-butyltin bis(acetylacetonate), tech., 95%; di-n-butyltin bis(acetylacetonate); di-n-butyltin bis(2,4-pentanedionate); di-n-butyl bis(2,4-pentanedionate)tin; dibutyltin bis(acetylacetonate); dibutyltin bis(2,4-pentanedionate); dibutyl bis(pentane-2,4-dionato-o,o')tin; tin, dibutyl bis(2,4-pentanedionato-.kappa.o,.kappa.o)-, (oc-6-11)-; Sn(acac)$Bu_2$; dibutyl bis(pentan-2,4-dionato-o,Ozinn; bis-(2,4-pentanedionato)-dibutyltin; dibutyl bis(2,4-pentanedionato-o,o")-; di-n-butyltin bis(acetylacetonate), tech.; dibutyltin bis (2,4-pentanedionate), typically 95%; EINECS 245-152-0; tin, dibutyl bis(2,4-pentanedionato-o,o')-, (oc-6-11)-, (molecular formula=$C_{18}H_{32}O_4Sn$)). In some embodiments, curing agents can contain one or more nucleophilic groups. Epoxy resins can contain an aliphatic (such as cyclic or acyclic) or an aromatic backbone or a combination of both. In some optional embodiments, the epoxy resins can contain other non-interfering chemical linkages (such as alkyl chains).

A) Resin Part

For example, the coating 14 described in FIG. 1 can be formed from a resin part that includes an epoxy material and a silicon. In some embodiments, a silicon can be or comprise polysiloxane. In addition, a silicon can be or comprise an organooxysilane.

Epoxy-polysiloxane polymers can be obtained by taking an epoxide resin having more than one 1,2-epoxy groups per molecule with an epoxide equivalent weight in the range of from 100 to about 2,000 that undergoes chain extension by reaction with the amine groups in a polysiloxane. Such polymers and processes are discussed below as described in U.S. Pat. Nos. 5,618,860 and 5,275,645, the contents of which are incorporated herein by reference.

Exemplary epoxide resins are non-aromatic hydrogenated cyclohexane dimethanol and diglycidyl ethers of hydrogenated Bisphenol A-type epoxide resin, such as Epon DPL-862, Eponex 1510, Heloxy 107 and Eponex 1513 (hydrogenated bisphenol A-epichlorohydrin epoxy resin) from Shell Chemical in Houston, Tex.; Santolink LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N. Y.; Epirez 505 from Rhone-Poulene located in Lousiville, Ky.; Aroflint 393 and 607 from Reichold located in Pensacola, Fla.; and ERL4221 from Union Carbide located in Tarrytown, N. Y. Other suitable non-aromatic epoxy resin include DER 732 and DER 736. Such non-aromatic hydrogenated epoxide resins are desired for their limited reactivity of about two, which promote formation of a linear epoxy polymer and prohibits formation of a cross-linked epoxy polymer. It is believed that the resulting linear epoxy polymer formed by adding the hardener to the epoxy resin is responsible for the enhanced weatherability of this composition. In some embodiments, a coating composition comprises in the range of from about 15 to about 45 percent by weight epoxy resin.

With respect to polysiloxane used to make up a resin part, exemplary polysiloxanes include, but are not limited to, those having the following formula:

where each $R_1$ is selected from the group consisting of the hydroxy group and alkyl, aryl, and alkoxy groups having up to six carbon atoms. Each $R_2$ is selected from the group consisting of hydrogen and alkyl and aryl groups having up to six carbon atoms. In some embodiments, $R_1$ and $R_2$ comprise groups having less than six carbon atoms to facilitate rapid hydrolysis of the polysiloxane, which reaction is driven by the volatility of the alcohol analog product of the hydrolysis. $R_1$ and $R_2$ groups having greater than six carbon atoms tend to impair the hydrolysis of the polysiloxane due to the relatively low volatility of each alcohol analog. Methoxy, ethoxy and silanol functional polysiloxanes having n selected molecular weights are about 400 to about 2000 which are preferred for formulating coating and flooring materials of the present invention. Methoxy, ethoxy and silanol functional polysiloxanes having molecular weights of less than 400 would produce a coating and flooring composition that would be brittle and offer poor impact resistance. Methoxy, ethoxy and silanol functional polysiloxanes having molecular weights of greater than 2000 produce a coating and flooring composition having both a viscosity outside the desired range from about 3,000 to 15,000 centipoise (cP) at 20° C., and are too viscous for application without adding solvent in excess of current volatile organic content (VOC) requirements.

Exemplary methoxy functional polysiloxanes include DC-3074 and DC-3037 from Dow Corning; GE SR191 and SY-550 from Wacker located in Adrian, Mich. Silanol functional polysiloxanes include, but are not limited to, Dow Corning's DC840, Z6018, Q1-2530 and 6-2230 intermediates. In some embodiments, a coating composition comprises in the range of from 15 to 45 percent by weight polysiloxane. In some embodiments, a flooring composition comprises in the range of from one to ten percent by weight polysiloxane. If the coating and flooring composition comprises an amount of polysiloxane outside each range, the coating and flooring composition produced will display inferior weatherability and chemical resistance. In some embodiments, a coating composition comprises approximately 30 percent by weight polysiloxane. In some embodiments, a flooring composition comprises approximately 3 percent by weight polysiloxane.

With respect to organooxysilane used to make up the resin component, preferred organooxysilanes have the general formula

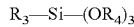

where $R_3$ is selected from the group consisting of alkyl and cycloalkyl groups containing up to six carbon atoms and aryl groups containing up to ten carbon atoms. $R_4$ is independently selected from the group consisting of alkyl, hydroxyalkyl, alkoxyalkyl and hydroxyalkoxyalkyl groups containing up to six carbon atoms. In some embodiments, $R_4$ comprise groups having up to six carbon atoms to facilitate rapid hydrolysis of the organooxysilane, which reaction is driven by the evaporation of the alcohol analog product of the hydrolysis. $R_4$ groups having greater than six carbon atoms tend to impair the hydrolysis of the organooxysilane due to the relatively low volatility of each alcohol analog.

Particularly preferred organooxysilanes are trialkoxysilanes such as Union Carbide's A-163 (methyl trimethoxy silane), A-162 and A-137, and Dow Corning's Z6070 and Z6124. A preferred coating composition comprises in the range of from one to ten percent by weight organooxysilane. In some embodiments, a flooring composition comprises up to about two percent by weight organooxysilane. If the coating and flooring composition comprises an amount of organooxysilane outside each range, the coating and flooring composition produced will display inferior impact resistance and chemical resistance. In some embodiments, a coating composition comprises approximately five percent by weight organooxysilane. In some embodiments, a flooring composition comprises approximately 0.7 percent by weight organooxysilane.

In certain embodiments, a commercially available resin part (including all ingredients) can be used in accordance with the present disclosure. For example, Can A is PSX 700A (from PPG) can be used as a resin part.

B) Cure Part

A resin part can then be mixed with a cure part. In some embodiments, a cure part may include at least one aminosilane and optionally a catalyst. In some embodiments, prior to combining, a first container includes a resin part, while a second container includes a cure part. Optionally, a catalyst can be combined and packaged with a cure part prior to mixing with a resin part.

While not wishing to be bound by any particular theory, it is believed that the curing of a silane compound-based epoxy involves the reaction of an epoxide resin with amine to form a cured epoxy polymer, and hydrolyric polycondensation of polysiloxane and organooxysilane to produce alcohol and a polysiloxane polymer. When an aminosilane is utilized a cure part, a amine moiety of the aminosilane undergoes the epoxy-amine addition reaction and a silane moiety of the aminosilane undergoes hydrolytic polycondensation. In a cured form, the resulting coating can exist as linear epoxy-modified polysiloxane which may have substantial advantages over conventional epoxy systems.

Amino-Silane

In some embodiments, an amino-silane can be used in a cure part in accordance with the present disclosure. Exemplary amino-silanes were listed and tested in Examples below.

In some embodiments, suitable amino-silanes used in accordance with the present invention have the general formula:

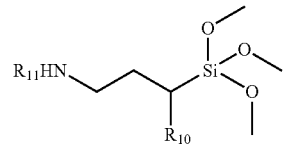

where $R_{11}$ and $R_{10}$ are independently selected from the group consisting of hydrogen, alkyl, hydroxyalkyl, alkoxyalkyl and hydroxyalkoxyalkyl groups containing up to six carbon atoms. In certain embodiments, $R_{10}$ is hydrogen. In certain embodiments, $R_{10}$ is hydrogen.

A cure part can be or comprise one or more aminosilanes. For example, DYNASYLAN 1189 (CAS #31024-56-3) and DYNASYLAN DAMO (CAS #1760-24-3) can be used alone or together in a cure part in accordance with the present disclosure. In some embodiments, any two aminosilanes can be used together in a cure part in a weight ratio of or more than about 0.1, about 0.3, about 0.5, about 0.8, about 1.0, about 1.2, about 1.3, about 1.4, about 1.5, about 1.6, about 1.7, about 1.8, about 1.9, about 2.0, about 3.0, about 5.0, about 10, about 20, about 30, about 40, about 50, about 100, or even about 200. In some embodiments, the weight ratio of any two aminosilanes can be in a range of about 0.1 to about 100, about 0.5 to about 20, or about 1 to about 10. In some embodiments, the weight ratio of any two aminosilanes can be in a range of any two values above. To give an example, DYNASYLAN 1189 (CAS #31024-56-3) and DYNASYLAN DAMO (CAS #1760-24-3) were mixed in various weight ratios as demonstrated in Examples.

In some embodiments, an amino-silane having amine hydrogen milliequivalent weigh about or more than about 3 grams, about 4 grams, about 5 grams, about 7 grams, about about 10 grams, about 12 grams, about 13 grams, about 14 grams, about 15 grams or about 20 grams. In some embodiments, an amino-silane having amine hydrogen milliequivalent weigh in a range of about 4 to about 15 grams. In some embodiments, an amino-silane having amine hydrogen milliequivalent weigh in a range of any two values above.

As discussed above, a resin part has an epoxy equivalent weight in a wide range depending on the epoxy ingredients in the resin part. When a cure part is mixed with a resin part, the resulting mixture (e.g., a formulation or mixed composition) has an amine to epoxy equivalent weight ratio depending on the weight ratio of two parts. In some embodiments, the amine to epoxy equivalent weight ratio of a formulation useful in accordance with the present disclosure can be more than or less than about 1.10, about 1.15, about 1.20, about 1.25, about 1.30, about 1.35, about 1.40, about 1.45, about 1.50, about 1.60, about 1.70, about 1.80, about 1.90 or even about 2.00. In some embodiments, the amine to epoxy equivalent weight ratio of a formulation useful in accordance with the present disclosure can be about, more than or less than about 2.10, about 2.15, about 2.20, about 2.25, about 2.30, about 2.35, about 2.40, about 2.45, about 2.50, about 2.55, about 2.60, about 2.65, about 2.70, about 2.75, about 2.80, about 2.85, about 2.90, about 2.95 or even about 3.00. In some embodiments, the amine to epoxy equivalent weight ratio of a formulation useful in accordance with the present disclosure can be about, more than or less than about 3.10, about 3.15, about 3.20, about 3.25, about 3.30, about 3.35, about 3.40, about 3.45, about 3.50, about 3.55, about 3.60, about 3.65, about 3.70, about 3.75, about 3.80, about 3.85, about 3.90, about 3.95 or even about 4.00. In some embodiments, the amine to epoxy equivalent weight ratio of a formulation useful in accordance with the present disclosure can be about, more than or less than about 4.10, about 4.15, about 4.20, about 4.25, about 4.30, about 4.35, about 4.40, about 4.45, about 4.50, about 4.55, about 4.60, about 4.65, about 4.70, about 4.75, about 4.80, about 4.85, about 4.90, about 4.95 or even about 5.00. In some embodiments, the amine to epoxy equivalent weight ratio of a formulation is in a range of about 1.10 to about 1.50, about 1.20 to about 1.30, or about 1.20 to about 1.25. In some embodiments, the amine to epoxy equivalent weight ratio of a formulation is in a range of about 2.10 to about 2.85, about 2.20 to about 2.70, or about 2.30 to about 2.60. In some embodiments, the amine to epoxy equivalent weight ratio of a formulation is in a range of about 2.20 to about 3.00, about 2.40 to about 2.90, or 2.50 to about 2.75. In some embodiments, the amine to epoxy equivalent weight ratio of a formulation is in a range of about 2.10 to about 3.00 or about 2.45 to about 2.60. In some embodiments, the amine to epoxy equivalent weight ratio of a formulation is in a range of about 2.85 to about 4.30, about 3.20 to about 3.95, or 3.40 to about 3.75. In some embodiments, the amine to epoxy equivalent weight ratio of a formulation is in a range of about 2.20 to about 3.30, about 2.50 to about 3.00, or 2.60 to about 2.90. In some embodiments, the amine to epoxy equivalent weight ratio of a formulation is in a range of about 2.20 to about 4.30 or about 2.75 to about 3.55. In some embodiments, the amine to epoxy equivalent weight ratio of a formulation is in a range between (and optionally inclusive of) a lower value and an upper value. In some embodiments, the lower value is about 1.0, about 1.1, about 1.2, about 1.25, about 1.3, about 1.35, about 1.4, about 1.45, about 1.5, about 1.55, about 1.6, about 1.65, about 1.7, about 1.75, about 1.8, about 1.85, about 1.9, about 1.95, about 2.0, about 2.05, about 2.1, about 2.15, about 2.2, about 2.25, about 2.3, about 2.35, about 2.4, about 2.45, about 2.5, about 2.55, about 2.6, about 2.65, about 2.7, about 2.75, about 2.8, about 2.85, about 2.9, about 2.95, about 3.0, about 3.05, about 3.1, about 3.15, about 3.2, about 3.25, about 3.3, about 3.35, about 3.4, about 3.45, or about 3.5; in some embodiments, the upper value is about 1.25, about 1.3, about 1.35, about 1.4, about 1.45, about 1.5, about 1.55, about 1.6, about 1.65, about 1.7, about 1.75, about 1.8, about 1.85, about 1.9, about 1.95, about 2.0, about 2.05, about 2.1, about 2.15, about 2.2, about 2.25, about 2.3, about 2.35, about 2.4, about 2.45, about 2.5, about 2.55, about 2.6, about 2.65, about 2.7, about 2.75, about 2.8, about 2.85, about 2.9, about 2.95, about 3.0, about 3.05, about 3.1, about 3.15, about 3.2, about 3.25, about 3.3, about 3.35, about 3.4, about 3.45, about 3.5, about 3.55, about 3.6, about 3.65, about 3.7, about 3.75, about 3.8, about 3.85, about 3.9, about 3.95, about 4.0, about 4.05, about 4.1, about 4.25, about 4.2, about 4.25, about 4.3, about 4.35, about 4.4, about 4.45, about 4.5, about 4.55, about 4.6, about 4.65, about 4.7, about 4.75, about 4.8, about 4.85, about 4.9, about 4.95, or about 5.0. In some embodiments, the amine to epoxy ratio in a provided formulation is within a range defined by any such lower value and upper value higher than the relevant lower value, inclusive of the relevant lower and upper values.

Relating to the amino to epoxy ratio, the mixing of a cure part with a resin part dictates the weight percentage of each ingredient or part in a formulation. For example, the weight percentage of a resin part can be in a wide range. In some embodiments, the weight percentage of a resin part in a formulation used in accordance with the present disclosure can be or more than about 0.1 wt %, about 1 wt %, about 10 wt %, about 20 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %. In some embodiments, the weight percentage of a resin part in a formulation can in a range of about 10 wt % to about 90 wt %, or about 80 wt % to about 90 wt %. In some embodiments, the weight percentage of a resin part in a formulation can in a range of any two values above.

Catalyst

Typically, one or more catalysts can be added in a cure part. Useful catalysts include metal driers well known in the paint industry e.g. zinc, manganese, cobalt, iron, lead and tin, each in the form of octoates, neodecanates and napthenates. Suitable catalysts include organotin catalysts having a general formula, $R_5Sn(R_6)(R_7)(R_8)$, are selected from a group consisting of alkyl, aryl, and alkoxy groups having up to eleven carbon atoms, and $R_7$ and $R_8$ can be selected from the same groups as $R_5$ and $R_6$, or from a group consisting of inorganic atoms such as halogens, sulphur or oxygen. Dibutyl tin dilaurate, dibutyl tin diacetate, organotitanates, sodium acetate, and aliphatic secondary or tertiary polyamines including propylamine, ethylamino ethanol, triethanolamine, triethylamine, and methyl diethanoi amine may be used alone or in combination to accelerate hydrolytic polycondensation of polysiloxane and silane compound.

In some embodiments, up to about 10 wt % (of total) catalyst may be added with a cure part to a resin part to speed drying and curing of formulations described herein. In some embodiments, the weight percentage of a catalyst in mixture of a cure part and a resin part can be about or less than about 10 wt %, about 9 wt %, about 8 wt %, about 7 wt %, about 6 wt %, about 5 wt %, about 4 wt %, about 3 wt %, about 2 wt %, about 1 wt %, about 0.5 wt %, about 0.2 wt %, or about 0.1 wt %. In some embodiments, the weight percentage of a catalyst in mixture of a cure part and a resin part can be in a range of 1-0.1 wt %. In some embodiments, the weight percentage of a catalyst in mixture of a cure part and a resin part can be in a range of about 10 to about 0.1 wt %, about 7 to about 0.5 wt %, or about 5 to about 1 wt %. In some embodiments, the weight percentage of a catalyst in mixture of a cure part and a resin part can be in a range of any two values above.

Hybrid Systems

Some or all of the formulation systems mentioned above may be combined together in a substantially solventless hybrid system. A hybrid system typically is an admixture of two types of resins. The hybrid system can either be a hybrid polymer system in a homogeneous medium or a hybrid polymer system in a non-homogeneous medium (e.g., a hybrid dispersion). Hybrid systems can contain two classes of different polymers or resins which interact cooperatively to provide desired properties, possibly in a solvent-based carrier. In some embodiments, the hybrid material in a solvent-based carrier can be part of a one component or a two-component coating material.

The coating 14 can be formed from a material in a liquid carrier. Preferably, the liquid carrier includes less than about 10%, and more preferably less than about 5%, and most preferably less than about 1% by volume/weight of any solvent-based carrier, e.g., an organic solvent. While not intending to be bound by theory, it is believed that some solvents whether organic or water-based) can be effective as a dispersive vehicle for the pigments and resins in a coating formulation prior to curing. For example, during the application of the formulation, they can aid in achieving an appropriate viscosity of the formulation. However, after the coating has been cured, it can be expected that there is no residual solvent. Exemplary solvents, when optionally present, can include 2-butoxyethanol, ethylene glycol, ethyl benzene, xylenes, methyl amyl ketone, isopropyl alcohol, propylene glycol monomethyl ether, ethylene glycol monobutyl ether, butanol, paraffins, alkanes, polypropylene glycol, Stoddard solvent, toluene, ethoxylated alkylphenol, 1-methyl-2-pyrrolidinone, or 1-ethylpyrrolidin-2-one. In some embodiments, the solvent can be or includes hydrocarbons (such as saturated hydrocarbons and unsaturated hydrocarbons), alcohols (such as alkoxy alcohols, ketonic alcohols), ketones, esters (such as acetates), glycol ethers, and glycol ether esters. Examples of hydrocarbons include toluene, xylene, naphtha (petroleum), petroleum distillates, ethyl benzene, trimethyl benzenes, and fractions of hydrocarbon mixtures obtained from petroleum refineries. Mixtures of any two or more of these solvents may also be utilized. Examples of alcohols include ethanol, n-propanol, iso-propanol, n-butanol, iso-butanol, benzyl alcohol, 2-(n-propoxy)ethanol, 2-(n-butoxy)ethanol, 3-(n-propoxy)ethanol, and 2-phenoxyethanol. Mixtures of any two or more of these solvents may also be utilized.

Examples of ketones include acetone, methyl ethyl ketone, methyl n-propyl ketone, methyl n-butyl ketone, and methyl isoamyl ketone. Mixtures of any two or more of these solvents may also be utilized.

Examples of esters include ethyl propanoate, ethyl butanoate, ethyl glycolate, propyl glycolate, butyl glycolate, and isoamyl glycolate, methyl acetate, ethyl acetate, n-butyl acetate, isoamyl acetate, and t-butyl acetate. Mixtures of any two or more of these solvents may also be utilized.

Other Modifying Agents in Provided Formulations

Accelerators are agents that speed up the curing process. Exemplary accelerators that can be used in the formulation include dibutyltin dialkanoate (e.g., dibutyltin dialaurate, dibutyltin dioctoate), and oxazolidine. Acid promoters are also optional agents that speed up the curing process. Acid promoters include aryl, alkyl, and aralkyl sulfonic acids; aryl, alkyl, and aralkyl phosphoric and phosphonic acids; aryl, alkyl, and aralkyl acid pyrophosphates; carboxylic acids; sulfonimides; mineral acids and mixtures thereof. Examples of sulfonic acids include benzenesulfonic acid, para-toluenesulfonic acid, dodecylbenzenesulfonic acid, and naphthalenesulfonic acid. Examples of aryl, alkyl, and aralkyl phosphates and pyrophosphates include phenyl, para-tolyl, methyl ethyl, benzyl, diphenyl, di-para-tolyl, di-methyl, di-ethyl, dibenzyl, phenyl-para-tolyl, methyl-ethyl, phenyl-benzyl phosphates and pyrophosphates. Examples of carboxylic acids include citric acid, benzoic acid, formic acid, acetic acid, propionic acid, butyric acid, dicarboxylic acids such as oxalic acid, and fluorinated acids such as trifluoroacetic acid. Examples of sulfonimides include dibenzene sulfonimide, di-para-toluene sulfonimide, methyl-para-toluene sulfonimide, and dimethyl sulfonamide. Examples of mineral acids include phosphoric acid, nitric acid, sulfuric acid and hydrochloric acid. In some embodiments, phosphoric acid, citric acid or a combination thereof can be utilized as an acid promoter.

Surface additives can modify the surface characteristics (such as surface tension properties, substrate wetting, gloss, feel, and slip) of the writable-erasable surface 16. Examples of surface additives can include modified polydimethyl siloxanes and polytetrafluoroethylene.

The curable compositions can also contain other optional ingredients such as fillers, surfactants, light stabilizers, pigments, opacifying agents, defoaming agent, surface gloss-modifying agent, biocides, viscosity-modifying agent, dispersing agents, reactive diluents, extender pigments, inhibitors for corrosion or efflorescence, flame retardants, intumescent agents, thermal agents for energy efficiency, additives for protection from UV and/or IR, self-cleaning agents, perfumes, or odor sustaining agents.

In some embodiments, the present invention provides curable compositions that are substantially free of one or more such optional ingredients. Indeed, the present invention encompasses the surprising finding that certain curable compositions as described herein that cure to become coatings characterized by one or more write-erase characteristics are sufficiently stable with respect to those write-erase characteristics that particular such optional ingredients can be added or removed without requiring adjustment of other components, and in particular without requiring adjustment of resin and/or cure components.

In particular, it is understood in the art that opacifying agents, and particularly titanium oxide opaciying agents, can interfere with reactions between chemical moieties involved in curing. For example, such opacifying agents can sometimes themselves react with chemical moieties (e.g., isocyanate, hydroxyl, epoxide groups) that would otherwise participate in curing of a curable composition. Thus, it is often expected in the art that components of a coating composition must be adjusted when presence or level of such an opacifying agent is changed.

The present disclosure, however, provides the surprising finding that certain previously described curable compositions that are characterized by particular write erase characteristics are sufficiently stable with respect to such write-erase characteristics that they maintain such characteristics independent of presence or level of an opacifying agent, and particularly of a titanium oxide opacifying agent.

The present disclosure therefore confirms and supports the utility and value of such curable compositions, and furthermore provides description of those embodiments of such compositions that are substantially free of any opacifying agent (or at least are substantially free of a titanium oxide opacifying agent). The present disclosure demonstrates that such opacifying-agent-free embodiments are characterized by the surprising and unexpected feature of maintaining one or more write erase characteristics observed in an otherwise-identical opacifying-agent-containing composition. Such compositions have the additional desirable attribute that they can cure to form a clear coating, and therefore can convert a surface of any color into a write-erase surface.

The present inventors further note that it is common in the coatings field to develop colored coatings through use of both an opacifying agent (which renders a composition including it substantially white) and also a pigment (which imparts color to the composition). The particularly remarkable clear compositions whose attributes are defined and described herein include those that are substantially free of one or more pigments, one or more opacifying agents, or both, and specifically include compositions that are substantially free of any pigment and any opacifying agent (i.e., are, and/or cure to be, clear).

Several commercial suitable light stabilizers are available from CIBA Specialty Chemicals under the trade names TINUVIN® (benzotriazole, triazine, or hindered amine based) and CHIMASSORB® (benzophenone based).

Wetting agents can modify the viscosity characteristics of the coating formulations. Examples of wetting agents can include silicone free family of agents, Metolat® available from Munzing Chemie GmbH.

Examples of opacifying agents can include zinc oxide, titanium dioxide, silicon dioxide, Kaolin clay, e.g., high whiteness Kaolin clay, or mixtures thereof.

Defoaming agents can release the trapped air in the coatings and can enhance the surface smoothness. Examples of defoaming agents can include polyethylene glycols, or silicone surfactants, e.g., polyether modified polydimethyl siloxane. Defoaming agents such as the BYK family of agents are available from BYK-Chemie GmbH.

Examples of viscosity modifying agents include polyurethanes, or a commercial acrylic copolymer, TAFIGEL®, available from Munzing Chemie GmbH.

0.5 wt %, about 0.2 wt %, or about 0.1 wt %. In some embodiments, the weight percentage of a modifying agent can be in a range of about 30 to about 20 wt %, about 20 to about 10 wt %, about 10 to about 1 wt %, or about 1 to about 0.1 wt %. In some embodiments, the weight percentage of a modifying agent can be in a range of about 30 to about 0.1 wt %, about 10 to about 0.5 wt %, or about 5 to about 1 wt %. In some embodiments, the weight percentage of a modifying agent can be in a range of any two values above.

In some embodiments, one or more modifying agents including the examples described herein can be provided in a resin and/or cure part before mixing of the two parts. For example, titanium dioxide can be provided in a resin and/or cure part. Additionally or alternatively, agents including, but not limited to, silicon dioxide or silica (e.g., Sylysia 350), aluminum oxide, modified urea (e.g., Byk 410), micronized, organic polymer (e.g., Ceraflour 1000) and combination thereof can be added to a resin part (e.g., Can A of commercially available PSX 700A from PPG).

Certain embodiments are further described in the following examples which are not intended to limit the scope of the disclosure.

EXEMPLIFICATION

Example 1

In accordance with many embodiments of the present disclosure, a degree of hydrophobicity is desirable on a dry-erase coating surface in order to provide sufficient chemical resistance to penetration from the dry erase marker solvents and pigments. However, the present disclosure provides an insight that many siloxane compounds useful to generate coatings with appropriate hydrophobicity show unacceptable VOC contents (i.e., VOC contents above 100 g/L or 140 g/L).

This Example describes testing and characteristics of amino-silanes for use in dry erase coating. Exemplary amino-silanes are listed in Table 1:

| Chemical Name | Trade Name | Molecular Weight | Amine hydrogen equivalent per mole | milliequivalent amine/gram | SiO milliequivalent/ gram |
|---|---|---|---|---|---|
| 2-aminoethyl-3-aminopropyl methyldimethoxysilane | dynasylan 1411 | 206.36 | 3 | 14.53 | 9.69 |
| n-butyl-3aminopropyl trimethoxysilane | dynasylan 1189 | 235.4 | 1 | 4.24 | 12.74 |
| 3-aminopropyl methyldiethoxysilane | dynasylan 1505 | 191.34 | 2 | 10.45 | 10.45 |
| 3-aminopropyl triethoxysilane | dynasylan AMEO | 221.37 | 2 | 9.03 | 13.55 |
| Proprietary silane | dynasylan AMEO-T | 221.37 | 2 | 9.03 | 13.55 |
| 2-aminoethyl-3-aminopropyl trimethoxysilane | dynasylan DAMO | 222.36 | 1 | 13.49 | 13.49 |

In some embodiments, a formulation or mixed composition can contain up to 30 wt % of one or more modifying agents. In some embodiments, the weight percentage of a modifying agent in a formulation or mixed composition can be about or less than about 30 wt %, about 25 wt %, about 20 wt %, about 15 wt %, about 10 wt %, about wt %, about 8 wt %, about 7 wt %, about 6 wt %, about 5 wt %, about 4 wt %, about 3 wt %, about 2 wt %, about 1 wt %, about As an example, a resin part as provided in the Can A of commercially available PSX 700 (from PPG) was utilized to be mixed with a cure part in this Example. Each of these amino-silanes was separately combined with a resin part in three different amine to epoxy ratios (i.e., 3.0 to 1.0, 2.0 to 1.0 and 1.25 to 1.0). Table 2 illustrates the mixtures made with dynasylan 1411 as an example to achieve different amine to epoxy ratios.

| Sample Trial 1 | (g) resin part | (g) cure part (only silane compound) | Amine/Epoxy Ratio |
|---|---|---|---|
| Mixture 1 | 50 | 13.64 | 3.00 |
| Mixture 2 | 50 | 9.1 | 2.00 |
| Mixture 3 | 50 | 5.68 | 1.25 |

Furthermore, added as a single variable to each mixture of the resin part and the cure part were the following three additives:

A non-ionic fluorosurfactant (Polyfox 154N)
A colloidal silica (Nissan Chemical IPA ST-UP), and
TEOS (tetraethyl orthosilicate)

Six amino-silanes at three different amine to epoxy ratios were attempted and examined with or without one of the above additives. Therefore, a total of 72 samples were prepared and evaluated.

A practical method employed for determining superior vs. inferior dry erase performance was to actually write and erase using common commercial dry erase markers on small scale samples of painted out formulations. Typically, samples were painted out using a standard nap roller and are evaluated for dry erase performance using the following subjective conditions: 1) eraseability—Does a conventional dry erase marker completely remove after application to the coating surface?; 2) staining—Does a conventional dry erase marker leave a permanent stain on the dry erase coating surface after application and removal?; and 3) ghosting—Following application and removal of a conventional dry erase marker is there a visible "ghost" of the original mark left on the dry erase coating?

Each of the above criteria were observed for performance based on a subjective evaluation. The purpose of this was to evaluate the dry erase coating (formula) under "real world" conditions and usage. The first and second conditions (eraseability and staining) were paramount to achieving "acceptable" dry erase performance. Only if a formulation passes the first of these conditions would it even be evaluated for ghosting.

Typical scoring/grading utilized are demonstrated below. Eraseability and staining were generally evaluated simultaneously according to the following score (or grade):

0—Marker does not erase well at all and leaves a substantial permanent stain
1—Marker is very difficult to remove and leaves some permanent residue
2—Marker demonstrates substantial difficulty in erasing but leaves little to no permanent staining
3—Marker requires moderate effort to erase but leaves no permanent stain
4—Eraseability of marker is very good and requires only slight effort to completely removing marking.
5—Eraseability of marker is excellent—all markings are completely removed with very little effort.

The results clearly showed that an amine to epoxy ration of 1.25:1 provided substantially better coating performance than the other ratios examines. In addition, it was evident that none of the additive components provided any significant improvement to the observations of samples with regard to dry eraseability. Our observations further concluded that there was significant difference in performance of two amino-silane compounds, DYNASYLAN 1189 (CAS #31024-56-3) and DYNASYLAN DAMO (CAS #1760-24-3), as compared to the others within the experimental group. To further evaluate the amine to epoxy ratios, additional experiments were performed as described in Example 1, using three amine to epoxy ratios: 1.30 to 1, 1.25 to 1, and 1.20 to 1. The results also showed that there was significant variation in dry erase performance dependent upon the relative amine reactivity in using more than one amine functional siloxane compound.

Example 2

Various components (e.g., components as described in Example 1) can be mixed and cured in the presence of at least an additive (e.g., catalyst, surface modifier, etc.).

For example, the mixtures of components described in Example 1 were mixed with an additive. Exemplary additives include two catalysts (dibutyltin dilaurate (DBTDL; CAS #77-58-7) and K-Kat tin free, a zinc complex catalyst (XK614)) and a surface modifier (PF 159).

As an example, various amounts of an additive were added into 16 samples using mixture 1 from Example 1 as illustrated in Table 3:

| | Weight of mixture #1 | Weight of additive | % DBTDL | % XK 614 | % PF 159 |
|---|---|---|---|---|---|
| 1A | 10 | 0 | 0 | 0 | 0 |
| 1B | 9.5 | 0.5 | 5 | 0 | 0 |
| 1C | 9.6 | 0.4 | 4 | 0 | 0 |
| 1D | 9.7 | 0.3 | 3 | 0 | 0 |
| 1E | 9.8 | 0.2 | 2 | 0 | 0 |
| 1F | 9.9 | 0.1 | 1 | 0 | 0 |
| 1G | 9.95 | 0.05 | 0.5 | 0 | 0 |
| 1H | 9.5 | 0.5 | 0 | 5 | 0 |
| 1I | 9.6 | 0.4 | 0 | 4 | 0 |
| 1J | 9.7 | 0.3 | 0 | 3 | 0 |
| 1K | 9.8 | 0.2 | 0 | 2 | 0 |
| 1L | 9.9 | 0.1 | 0 | 1 | 0 |
| 1M | 9.95 | 0.05 | 0 | 0.5 | 0 |
| 1N | 9.7 | 0.3 | 0 | 0 | 3 |
| 1O | 9.8 | 0.2 | 0 | 0 | 2 |
| 1P | 9.9 | 0.1 | 0 | 0 | 1 |

The results of this series of experiments showed that a significant amount of the organotin catalyst (dibutyltin dilaurate) would be beneficial in order to achieve an acceptable level of dry erase performance within the prescribed cure time. These results also aided in our conclusion that a surface modifier is optional, as this had an effect to increase the likelihood of marker beading on the coating surface.

Example 3

Exemplary combinations of components were conducted and evaluated in series as showed in Tables 4-11:

| Resin part (g) | DYNASYLAN DAMO (g) | DYNASYLAN 1189 (g) | Amino/Epoxy Ratio | Dibutyltin Dilaurate (g) |
|---|---|---|---|---|
| 65.0 | 8.9 | 0.090 | 1.40 | 0.45 |
| 65.0 | 8.6 | 0.087 | 1.36 | 0.43 |
| 65.0 | 8.3 | 0.084 | 1.31 | 0.42 |
| 65.3 | 8.0 | 0.081 | 1.26 | 0.40 |
| 64.7 | 7.6 | 0.077 | 1.20 | 0.38 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 65.0 | 8.8 | 0.463 | 1.41 | 0.46 |
| 65.0 | 8.5 | 0.447 | 1.36 | 0.45 |
| 65.0 | 8.1 | 0.426 | 1.29 | 0.43 |
| 65.3 | 7.9 | 0.416 | 1.26 | 0.42 |
| 64.7 | 7.5 | 0.395 | 1.20 | 0.39 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 65.0 | 8.6 | 0.956 | 1.40 | 0.48 |
| 65.0 | 8.3 | 0.922 | 1.35 | 0.46 |
| 65.0 | 8.0 | 0.889 | 1.30 | 0.44 |
| 65.3 | 7.7 | 0.856 | 1.24 | 0.43 |
| 64.7 | 7.4 | 0.822 | 1.21 | 0.41 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 65.0 | 8.1 | 2.70 | 1.41 | 0.54 |
| 65.0 | 7.8 | 2.60 | 1.36 | 0.52 |
| 65.0 | 7.5 | 2.50 | 1.30 | 0.50 |
| 65.3 | 7.2 | 2.40 | 1.25 | 0.48 |
| 64.7 | 6.9 | 2.30 | 1.20 | 0.46 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 65.0 | 6.8 | 6.80 | 1.41 | 0.68 |
| 65.0 | 6.5 | 6.50 | 1.34 | 0.65 |
| 65.0 | 6.3 | 6.30 | 1.30 | 0.63 |
| 65.3 | 6.1 | 6.10 | 1.26 | 0.61 |
| 64.7 | 5.8 | 5.80 | 1.20 | 0.58 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 75.0 | 2.25 | 16.5 | 1.01 | 0.94 |
| 75.0 | 4.50 | 14.3 | 1.22 | 0.94 |
| 75.0 | 6.83 | 11.3 | 1.41 | 0.90 |
| 75.0 | 6.83 | 11.3 | 1.41 | 0.90 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 600 | 36.0 | 114.0 | 1.22 | 7.50 |
| 600 | 54.6 | 90.0 | 1.41 | 7.23 |
| 600 | 54.6 | 90.0 | 1.41 | 7.23 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 900 | 54 | 171 | 1.2 | 11.25 |
| 900 | 68 | 157 | 1.33 | 11.25 |
| 900 | 81.9 | 143 | 1.44 | 11.25 |

Example 4

Further experiments on combinations of two parts without any pigment/opacifying agent were conducted to produce a clear coating. A resin part as provided in the Can A of commercially available PSX 700A (from PPG) was utilized to be mixed with a cure part. A cure part can be or include dynasylan 1189, dynasylan DAMO, and dibutyltin dilaurate as demonstrated in Example 3. As an example, two parts were mixed using a volumetric aspect ratio of Part A (a resin part) to Part B (a cure part) of 2.5.

Series of exemplary weight mixes of two parts were conducted and evaluated as showed in Tables 12-17:

| Resin part (g) | DYNASYLAN DAMO (g) | DYNASYLAN 1189 (g) | Dibutyltin Dilaurate (g) |
|---|---|---|---|
| 532 | 67.0 | 117.0 | 8.2 |
| 532 | 63.8 | 111.4 | 8.8 |
| 532 | 60.6 | 105.8 | 8.4 |

| Component | Rang of wt % on total weight |
|---|---|
| Resin part | 70-75 |
| DYNASYLAN DAMO | 8.5-9.3 |
| DYNASYLAN 1189 | 15-16.5 |
| Dibutyltin Dilaurate | 1-2 |
| Pigment | 0 |

| Component | Rang of wt % on total weight |
|---|---|
| Resin part | 75-80 |
| DYNASYLAN DAMO | 8.5-9.3 |
| DYNASYLAN 1189 | 15-16.5 |
| Dibutyltin Dilaurate | 1-2 |
| Pigment | 0 |

| Component | Rang of wt % on total weight |
|---|---|
| Resin part | 70-80 |
| DYNASYLAN DAMO | 8-10 |
| DYNASYLAN 1189 | 14-17 |
| Dibutyltin Dilaurate | 1-1.5 |
| Pigment | 0 |

| Component | Rang of wt % on total weight |
|---|---|
| Resin part | 70-80 |
| DYNASYLAN DAMO | 5-10 |
| DYNASYLAN 1189 | 10-20 |
| Dibutyltin Dilaurate | 1-1.5 |
| Pigment | 0 |

| Component | Rang of wt % on total weight |
|---|---|
| Resin part | 70-80 |
| DYNASYLAN DAMO | 5-10 |
| DYNASYLAN 1189 | 10-20 |
| Dibutyltin Dilaurate | 1-2 |
| Pigment | 0 |

Example 5

This Example describes additional or alternative testing and characteristics of amino-silanes for use in dry erase coating. A resin part as provided in the Can A of commercially available PSX 700A (from PPG) was utilized. Exemplary amino-silanes alone or mixed were provided as a cure part, which was then mixed with a resin part at three different amine to epoxy ratios.

To evaluate dry erase performance, a practical method was developed to determine the soak time of each formulation. Samples were painted to a substrate and allowed to cure for four days. Then markers were applied to the cured paint. Each individual marker was applied in an area roughly two inches wide and six inches long. After thirty minutes, a half inch by width of the marking was removed with a dry erase cloth. The cured paint was inspected for eraseability of the marking from its surface every seven days or until failure was noted. The eraseability was given a subjective numerical value as follows:

0—Marker does not erase well at all and leaves a substantial permanent stain
1—Marker is very difficult to remove and leaves some permanent residue
2—Marker demonstrates substantial difficulty in erasing but leaves little to no permanent staining
3—Marker requires moderate effort to erase but leaves no permanent stain
4—Eraseability of marker is very good and requires only slight effort to completely removing marking.
5—Eraseability of marker is excellent—all markings are completely removed with very little effort.

Similar to Examples 3, exemplary combinations of components were conducted and evaluated in series as showed in Tables 18 and 19:

| Resin part (g) | DYNASYLAN AMEO (g) | Amino/Epoxy Ratio | SY350/Propylene Carbonate mixture |
|---|---|---|---|
| 330.6 | 135 | 3.56 | 25.2 |
| 330.6 | 132 | 3.48 | 64.0 |
| 330.6 | 132 | 3.48 | 32.0 |
| 330.6 | 132 | 3.48 | 96.4 |
| 330.6 | 162 | 4.28 | 30.2 |
| 330.6 | 108 | 2.85 | 20.2 |
| 330.6 | 142 | 3.75 | 26.5 |
| 330.6 | 128 | 3.38 | 23.9 |
| 330.6 | 149 | 3.93 | 27.7 |
| 330.6 | 122 | 3.22 | 22.7 |

| Resin part (g) | DYNASYLAN DAMO (g) | DYNASYLAN 1189 (g) | Amino/Epoxy Ratio | Dibutyltin Dilaurate (g) |
|---|---|---|---|---|
| 532 | 63.78 | 111.45 | 2.76 | 8.76 |
| 532 | 67.00 | 117.00 | 2.90 | 8.20 |
| 532 | 63.80 | 111.40 | 2.76 | 8.80 |
| 532 | 60.60 | 105.80 | 2.62 | 8.40 |
| 532 | 66.97 | 117.02 | 2.90 | 9.20 |
| 532 | 60.59 | 105.88 | 2.62 | 8.32 |
| 532 | 70.15 | 122.59 | 3.04 | 9.64 |
| 532 | 57.41 | 100.21 | 2.48 | 7.89 |
| 532 | 76.54 | 133.74 | 3.31 | 10.52 |
| 532 | 51.02 | 89.16 | 2.21 | 7.01 |
| 532 | 82.91 | 144.88 | 3.59 | 11.39 |
| 532 | 44.65 | 78.01 | 1.93 | 6.13 |
| 532 | 15.96 | 117.04 | 2.07 | 7.17 |

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way.

Other Embodiments and Equivalents

While the present disclosures have been described in conjunction with various embodiments and examples, it is not intended that they be limited to such embodiments or examples. On the contrary, the disclosures encompass various alternatives, modifications, and equivalents, as will be appreciated by those of skill in the art. Accordingly, the descriptions, methods and diagrams of should not be read as limited to the described order of elements unless stated to that effect.

Although this disclosure has described and illustrated certain embodiments, it is to be understood that the disclosure is not restricted to those particular embodiments. Rather, the disclosure includes all embodiments that are functional and/or equivalents of the specific embodiments and features that have been described and illustrated.

We claim:

1. A dry-erase paint composition comprising:
    a resin part comprising an epoxy, a polysiloxane and an organooxysilane; and
    a cure part comprising one or more amino-silanes;
    the resin part and the cure part being designed and selected to have an amine to epoxy equivalent weight ratio in a range of about 1.3 to about 5, wherein the paint composition is substantially free of any opacifying agent or pigment.

2. The dry-erase paint composition of claim 1, wherein the cure part further comprises a catalyst.

3. The dry-erase paint composition of claim 1, wherein the one or more amino-silanes is selected from 2-aminoethyl-3-aminopropyl methyldimethoxysilane, n-butyl-3aminopropyl trimethoxysilane, 3-aminopropyl methyldiethoxysilane, 3-aminopropyl triethoxysilane, 2-aminoethyl-3-aminopropyl trimethoxysilane or any combination thereof.

4. The dry-erase paint composition of claim 1, wherein the resin part and the cure part, when combined together, cure to form a clear surface coating characterized by a dry-erase characteristic is selected from the group consisting of an average surface roughness (Ra) of less than about 7,500 nm; a maximum surface roughness (Rm) of less than about 10,000 nm; a 60 degree gloss of higher than 70; a contact angle of less than about 150 degrees; a porosity of less than about 45 percent; an elongation at break of between about 10 percent and about 100 percent; a Sward hardness of greater than about 3; a Taber abrasion value of less than about 150 mg/thousand cycles; a sag resistance of between about 4 mils and about 24 mils, and combination thereof.

5. The dry-erase paint composition of claim 1, wherein the resin part and the cure part, when combined together, cure to form a clear surface coating characterized in that, when its surface is written on with a marking material comprising a colorant and a solvent, the solvent comprising one or more of water, alcohols, alkoxy alcohols, ketones, ketonic alcohols, esters, acetates, mineral spirits, or mixtures thereof, the marking material can be erased from the surface of the write-erasable material to be substantially invisible for more than 100 cycles of writing and erasing at the same position.

6. The dry-erase paint composition of claim 1, wherein the resin part and the cure part, when combined together, cure to form a clear surface coating characterized by a soak time of at least about 4.

7. The dry-erase paint composition of claim 1, having volatile organic compounds (VOCs) of less than 140 g/L.

8. The dry-erase paint composition of claim 1, having VOCs of less than 100 g/L.

9. The dry-erase paint composition of claim 1, wherein the resin part is in a first container and the cure part is in a second container.

10. A dry-erase product comprising:
a curable composition extending upon a substrate, the curable composition being comprised of a combination of
a resin part comprising an epoxy, a polysiloxane and an organooxysilane; and
a cure part comprising one or more amino-silanes,
wherein the curable composition has an amine to epoxy equivalent weight ratio in a range of about 1.3 to about 5, and
wherein the curable composition is substantially free of any opacifying agent or pigment and is characterized in that it cures under ambient conditions to form a clear surface coating characterized by at least one dry-erase characteristic.

11. A method of forming a dry-erase product, the method comprising:
applying a paint composition to a substrate to form a coating that cures to provide a clear surface, wherein the paint composition comprises:
a resin part comprising an epoxy, a polysiloxane and an organooxysilane; and
a cure part comprising one or more amino-silanes,
the resin part and the cure part being designed and selected to have an amine to epoxy equivalent weight ratio in a range of about 1.3 to about 5, they cure to form a clear surface coating that demonstrates at least one dry-erase characteristic, wherein the paint composition is substantially free of any opacifying agent or pigment.

12. A paint composition comprising:
a resin part comprising an epoxy, a polysiloxane and an organooxysilane; and
a cure part comprising one or more amino-silanes, which one or more amino-silanes comprise a combination of 2-aminoethyl-3-aminopropyl trimethoxysilane and n-butyl-3-aminopropyl trimethoxysilane;
the resin part and the cure part being designed and selected such that, when combined together, they cure to form a clear surface coating that demonstrates at least one dry-erase characteristic, wherein the paint composition is substantially free of any opacifying agent or pigment.

13. The paint composition of claim 12, wherein the paint composition has an amine to epoxy equivalent weight ratio in a range of about 1 to about 5.

14. The paint composition of claim 13, wherein the at least one dry-erase characteristic is selected from the group consisting of an average surface roughness (Ra) of less than about 7,500 nm; a maximum surface roughness (Rm) of less than about 10,000 nm; a 60 degree gloss of higher than 70; a contact angle of less than about 150 degrees; a porosity of less than about 45 percent; an elongation at break of between about 10 percent and about 100 percent; a Sward hardness of greater than about 3; a Taber abrasion value of less than about 150 mg/thousand cycles; a sag resistance of between about 4 mils and about 24 mils, and combination thereof.

15. The paint composition of claim 13, wherein the clear surface coating is characterized in that, when its surface is written on with a marking material comprising a colorant and a solvent, the solvent comprising one or more of water, alcohols, alkoxy alcohols, ketones, ketonic alcohols, esters, acetates, mineral spirits, or mixtures thereof, the marking material can be erased from the surface of the write-erasable material to be substantially invisible for more than 100 cycles of writing and erasing at the same position.

16. The method of claim 11, further comprising: before the applying step, a step of combining the resin part and the cure part to have the amine to epoxy equivalent weight ratio in the range of about 1.3 to about 5, thereby forming the paint composition.

* * * * *